(12) United States Patent
Goodrich et al.

(10) Patent No.: US 11,508,135 B2
(45) Date of Patent: Nov. 22, 2022

(54) AUGMENTED REALITY CONTENT GENERATORS INCLUDING 3D DATA IN A MESSAGING SYSTEM

(71) Applicant: Snap Inc., Santa Monica, CA (US)

(72) Inventors: Kyle Goodrich, Venice, CA (US); Samuel Edward Hare, Los Angeles, CA (US); Maxim Maximov Lazarov, Culver City, CA (US); Tony Mathew, Los Angeles, CA (US); Andrew James McPhee, Culver City, CA (US); Daniel Moreno, Los Angeles, CA (US); Wentao Shang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/301,735

(22) Filed: Apr. 13, 2021

(65) Prior Publication Data

US 2021/0319625 A1 Oct. 14, 2021

Related U.S. Application Data

(60) Provisional application No. 63/009,158, filed on Apr. 13, 2020.

(51) Int. Cl.
*G06T 19/00* (2011.01)
*G06F 3/0482* (2013.01)
(Continued)

(52) U.S. Cl.
CPC .......... *G06T 19/006* (2013.01); *G06F 3/0482* (2013.01); *G06F 3/0488* (2013.01);
(Continued)

(58) Field of Classification Search
CPC ................... G06T 19/006; G06T 5/005; G06T 2207/10028; G06F 3/04815; G06F 3/0482; G06F 3/0488
See application file for complete search history.

(56) References Cited

U.S. PATENT DOCUMENTS

2011/0201362 A1 8/2011 Bregman-Amitai et al.
2016/0133230 A1 5/2016 Daniels et al.
(Continued)

OTHER PUBLICATIONS

Budiu, Raluca, "Carousels on Mobile Devices", Aug. 19, 2018, https://www.nngroup.com/articles/mobile-carousels/ (Year: 2018).*
(Continued)

*Primary Examiner* — Michelle L Sams
(74) *Attorney, Agent, or Firm* — Schwegman Lundberg & Woessner, P.A.

(57) ABSTRACT

The subject technology selects a set of augmented reality content generators from available augmented reality content generators, the selected set of augmented reality content generators comprising at least one augmented reality content generator for applying a three-dimensional (3D) effect. The subject technology causes display of a carousel interface including selectable graphical items, each selectable graphical item corresponding to a respective augmented reality content generator. The subject technology receives a selection of a first selectable graphical item from the selectable graphical items, the first selectable graphical item including a first augmented reality content generator for applying a first 3D effect. The subject technology applies, to first image data and first depth data, the first augmented reality content generator corresponding to the selected first selectable graphical item. The subject technology generates a message including the applied first augmented reality content generator to the first image data and the first depth data.

20 Claims, 17 Drawing Sheets

(51) Int. Cl.
   *G06F 3/0488* (2022.01)
   *G06T 5/00* (2006.01)
   *G06F 3/04815* (2022.01)

(52) U.S. Cl.
   CPC .......... *G06F 3/04815* (2013.01); *G06T 5/005* (2013.01); *G06T 2207/10028* (2013.01)

(56) References Cited

U.S. PATENT DOCUMENTS

| | | |
|---|---|---|
| 2017/0243352 A1 | 8/2017 | Kutliroff et al. |
| 2019/0050427 A1 | 2/2019 | Wiesel et al. |
| 2019/0082118 A1* | 3/2019 | Wang .................. H04N 5/265 |
| 2019/0362554 A1* | 11/2019 | Chen ................ H04M 1/72439 |
| 2020/0089389 A1 | 3/2020 | Grasset et al. |

OTHER PUBLICATIONS

Thakur, A & Paul, S., "Introduction to image inpainting with deep learning" Apr. 2, 2020, https://wandb.ai/site/articles/introduction-to-image-inpainting-with-deep-learning (Year: 2020).*

"International Application Serial No. PCT/US2021/070379, International Search Report dated Jul. 27, 2021", 3 pgs.

"International Application Serial No. PCT/US2021/070379, Written Opinion dated Jul. 27, 2021", 4 pgs.

* cited by examiner

AUGMENTED REALITY CONTENT GENERATORS INCLUDING 3D DATA IN A MESSAGING SYSTEM

CLAIM OF PRIORITY

This application claims the benefit of priority to U.S. Provisional Application Ser. No. 63/009,158, filed on Apr. 13, 2020, which is incorporated herein by reference in its entirety for all purposes.

BACKGROUND

With the increased use of digital images, affordability of portable computing devices, availability of increased capacity of digital storage media, and increased bandwidth and accessibility of network connections, digital images have become a part of the daily life for an increasing number of people.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
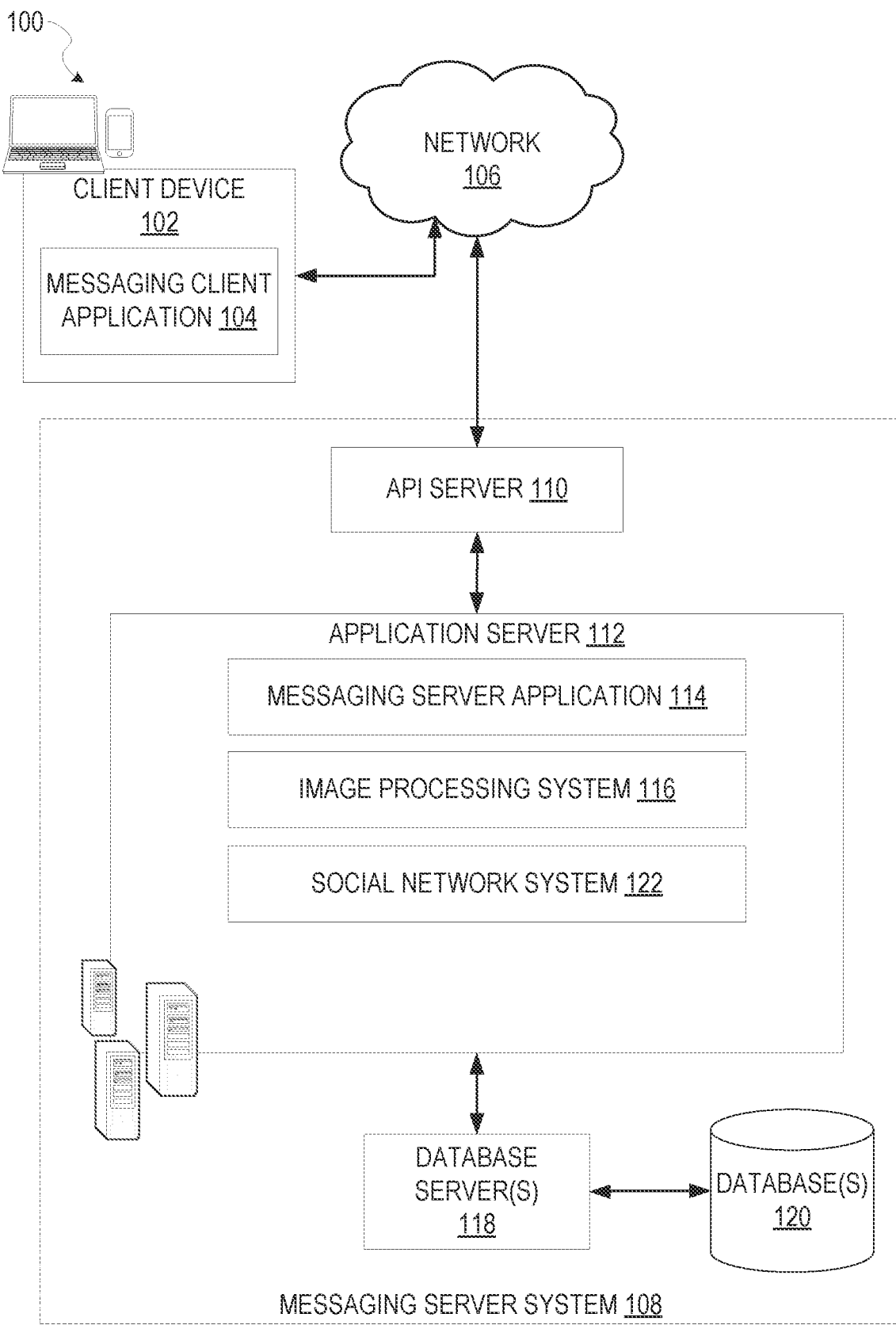
FIG. 1 is a diagrammatic representation of a networked environment in which the present disclosure may be deployed, in accordance with some example embodiments.

Users with a range of interests from various locations can capture digital images of various subjects and make captured images available to others via networks, such as the Internet. To enhance users' experiences with digital images and provide various features, enabling computing devices to perform image processing operations on various objects and/or features captured in a wide range of changing conditions (e.g., changes in image scales, noises, lighting, movement, or geometric distortion) can be challenging and computationally intensive.

As discussed herein, the subject infrastructure supports the creation and sharing of interactive three dimensional (3D) media, referred to herein as messages including 3D content or AR effects, throughout various components of a messaging system. The infrastructure as described herein enables other forms of 3D and interactive media to be provided across the subject system, which allows for depth-based and interactive media to be shared across the messaging system and alongside photo and video messages. In example embodiments described herein, messages can enter the system from a live camera or via from storage (e.g., where messages including 3D content and/or AR effects are stored in memory or a database). The subject system supports motion sensor input and manages the sending and storage of depth data, and loading of external effects and asset data.

As described herein, a message includes an interactive 3D image including at least image and depth data. In an example embodiment, a message is rendered using the subject system to visualize the spatial detail/geometry of what the camera sees, in addition to a traditional image texture. When a viewer interacts with this message by moving the client device, the movement triggers corresponding changes in the perspective the image and geometry are rendered at to the viewer.

Embodiments of the subject technology enable improvements in the function of a computing device (e.g., computer, mobile device, and the like) including, for example, providing reduction in utilization of computing resources (e.g., CPU, GPU, memory). In an example, the technical improvements also involve utilizing server or remote computing resources to process and render AR content, while in yet another example, AR content can be rendered by a given computing device and then propagated to other computing devices for presentation. Through the combination and utilization of various techniques described herein, a latency of displaying AR content items (e.g., a duration of time(s) for the AR content to be generated and subsequently rendered on the respective display of a given device can be reduced), in comparison with other existing implementations, to provide a more immersive and compelling user experience.

As referred to herein, the phrase "augmented reality experience," "augmented reality content item," "augmented reality content generator" includes or refers to various image processing operations corresponding to an image modification, filter, LENSES, media overlay, transformation, and the like, as described further herein.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
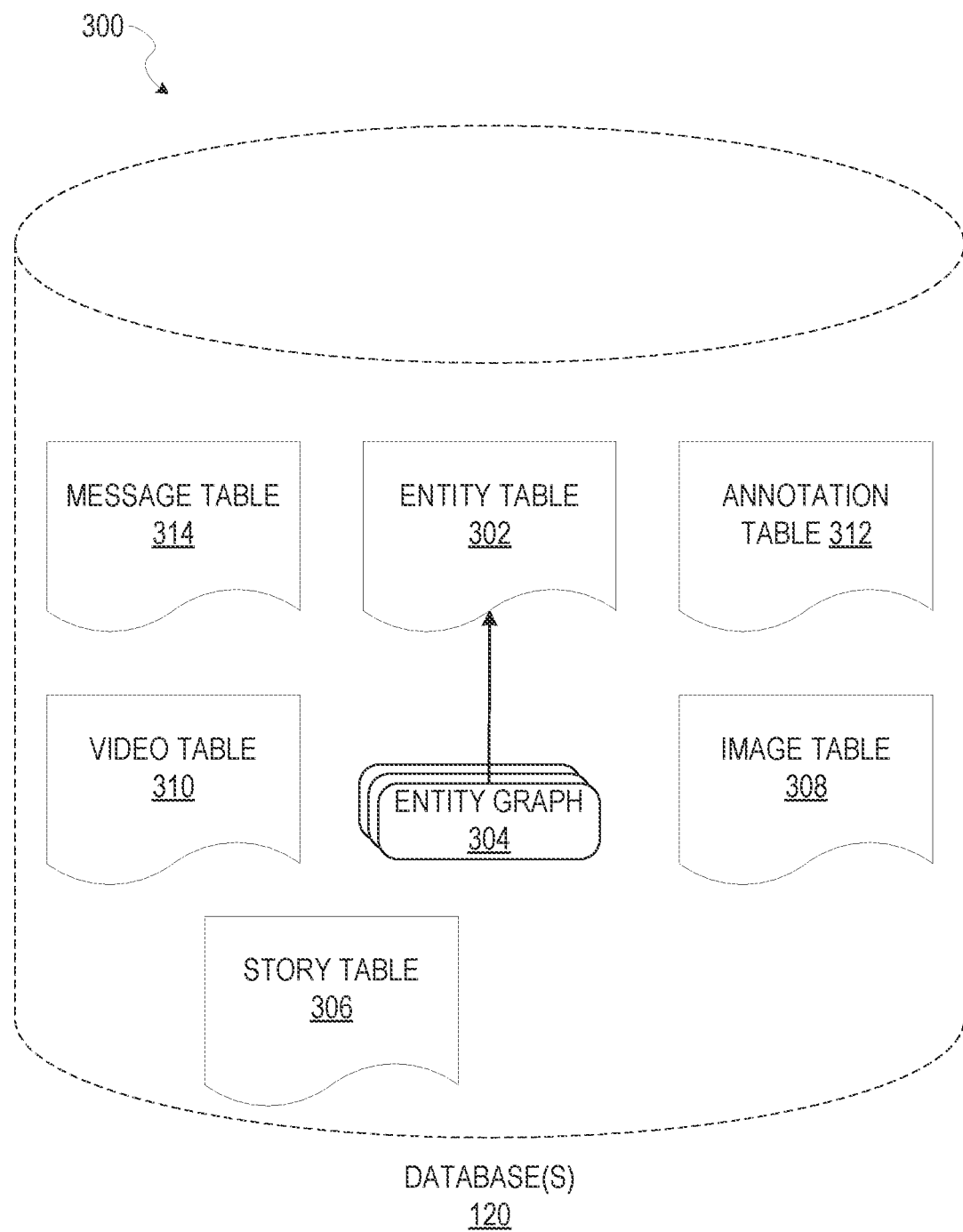
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is 'following', and also the identification of other entities and interests of a particular user.

The application server 112 is communicatively coupled to a database server 118, which facilitates access to a database 120 in which is stored data associated with messages processed by the messaging server application 114.

Figure 2:
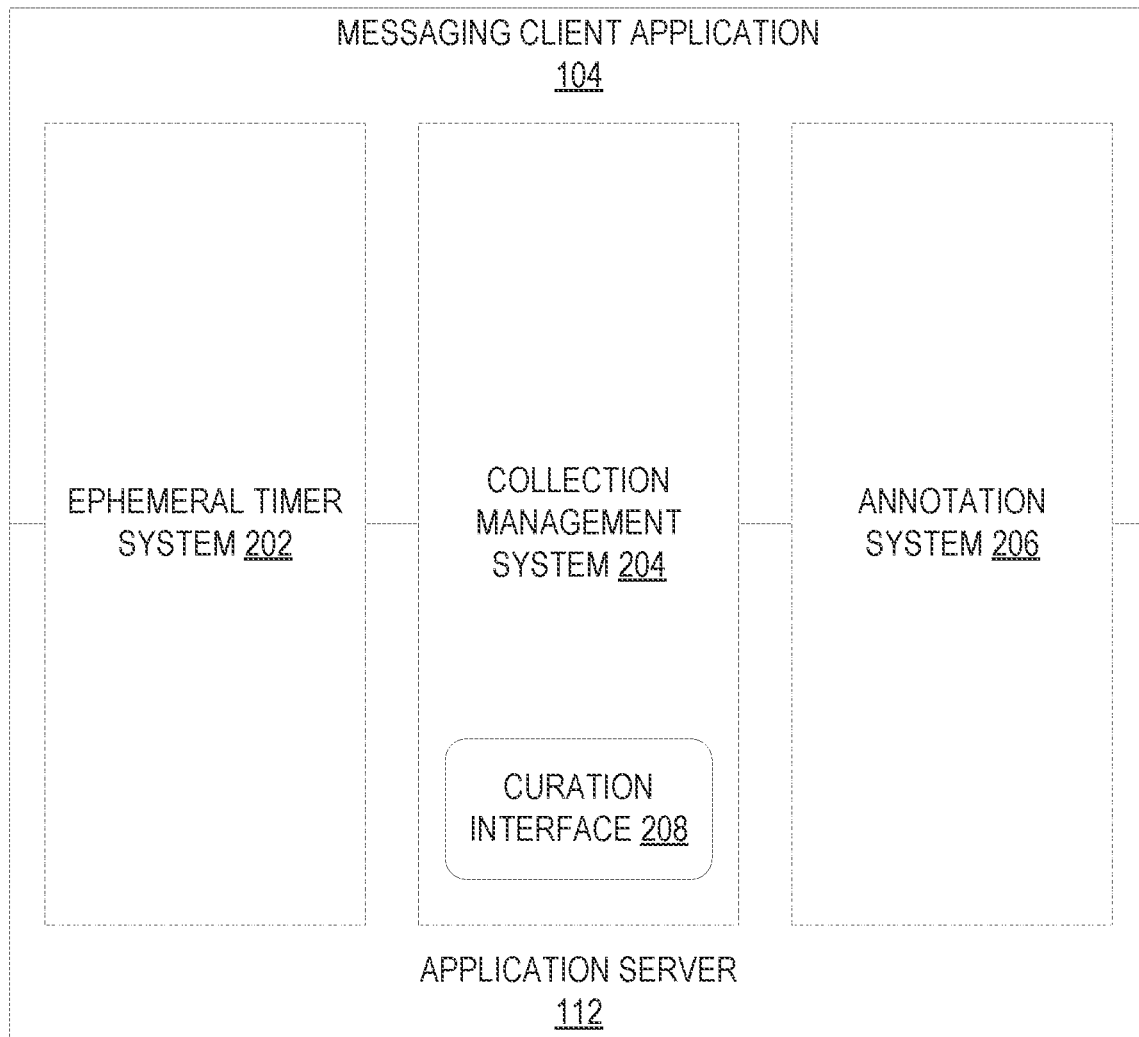
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an 'event gallery' or an 'event story.' Such a collection may be made available for a specified time period, such as the duration of an event to which the content relates. For example, content relating to a music concert may be made available as a 'story' for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery lite for a client device 102, or the current time.

Other annotation data that may be stored within the image table 308 are augmented reality content generators (e.g., corresponding to applying LENSES, augmented reality experiences, or augmented reality content items). An augmented reality content generator may be a real-time special effect and sound that may be added to an image or a video.

As described above, augmented reality content generators, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content generators, a user can use a single video clip with multiple augmented reality content generators to see how the different augmented reality content generators will modify the stored clip. For example, multiple augmented reality content generators that apply different pseudorandom movement models can be applied to the same content by selecting different augmented reality content generators for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content generators will look within different windows in a display at the same time. This can, for example, enable multiple windows with different pseudorandom animations to be viewed on a display at the same time.

Data and various systems using augmented reality content generators or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content generators thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

In some example embodiments, a graphical processing pipeline architecture is provided that enables different augmented reality experiences (e.g., AR content generators) to be applied in corresponding different layers. Such a graphical processing pipeline provides an extensible rendering engine for providing multiple augmented reality experiences that are included in a composite media (e.g., image or video) for rendering by the messaging client application 104 (or the messaging system 100).

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a 'personal story' in the form of a collection of content that has been created and sent/broadcast by that user. To this end, the user interface of the messaging client application 104 may include an icon that is user-selectable to enable a sending user to add specific content to his or her personal story.

A collection may also constitute a 'live story,' which is a collection of content from multiple users that is created manually, automatically, or using a combination of manual and automatic techniques. For example, a 'live story' may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a 'live story' told from a community perspective.

A further type of content collection is known as a 'location story', which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
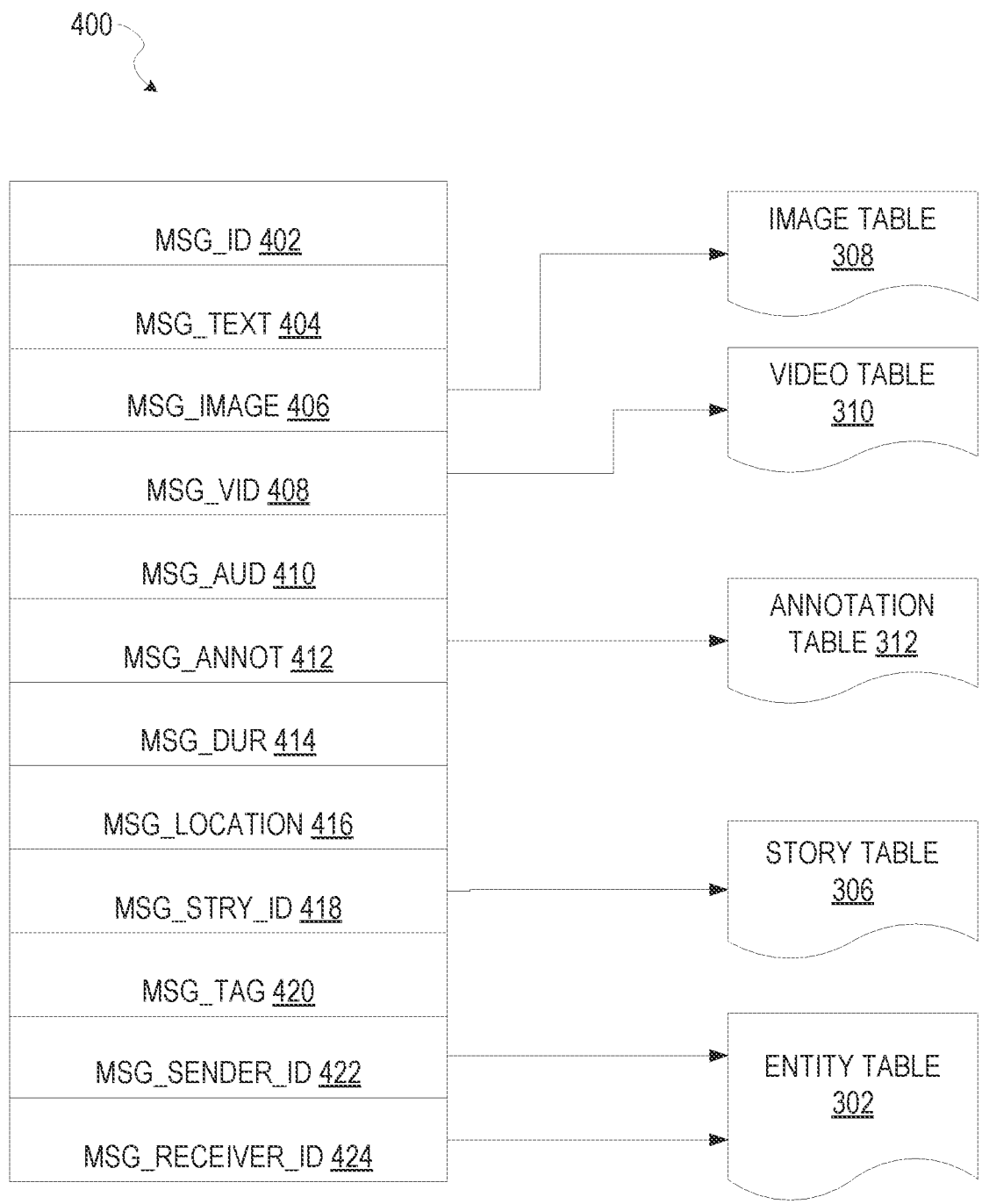
FIG. 4 is a diagrammatic representation of a message, in accordance with some example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as 'in-transit' or 'in-flight' data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., 'stories') with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
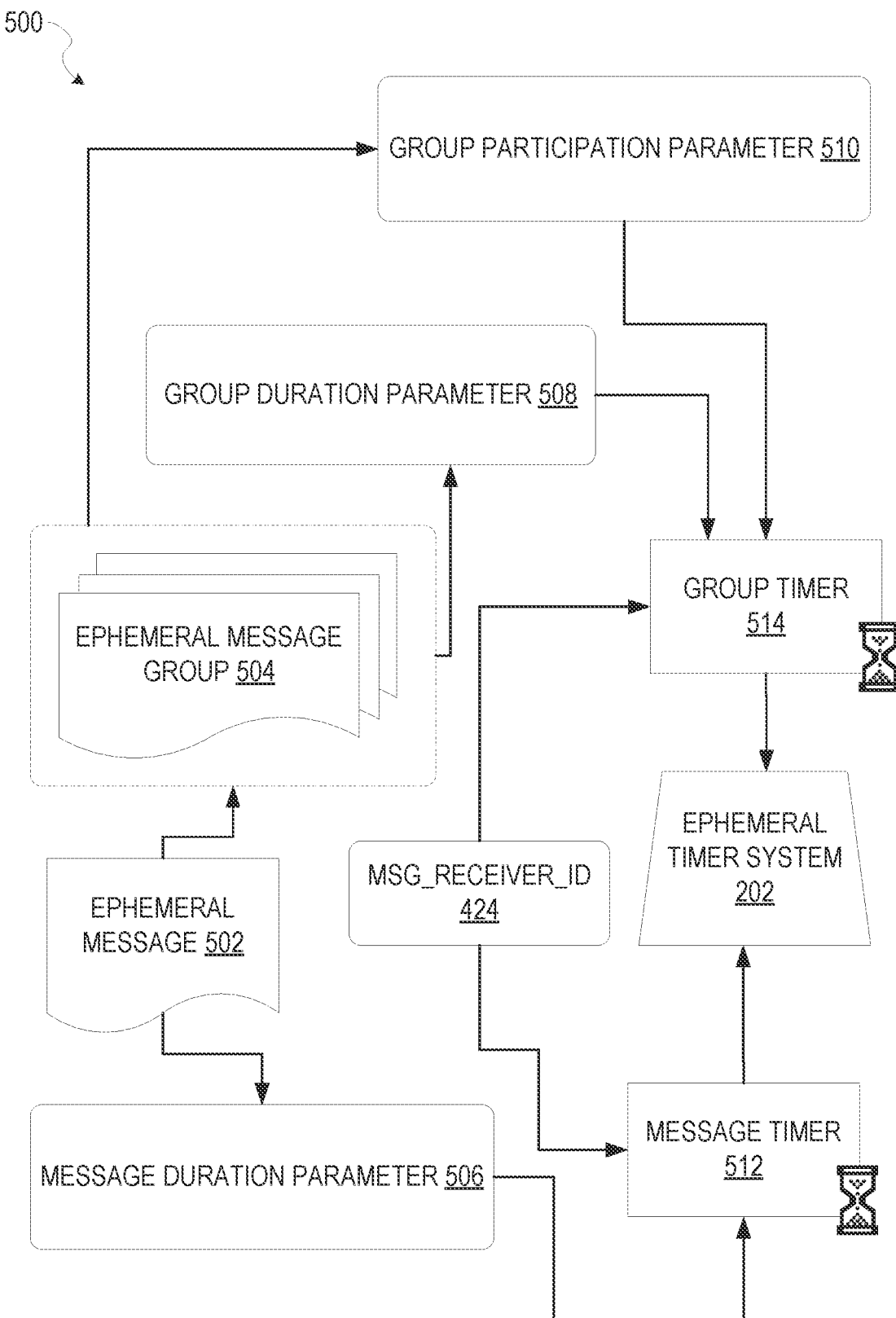
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may 'expire' and become inaccessible within the context of the ephemeral message group 504, prior to the ephemeral message group 504 itself expiring in terms of the group duration parameter 508. The group duration parameter 508, group participation parameter 510, and message receiver identifier 424 each provide input, to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

As described above, media overlays, such as LENSES, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple media overlays (e.g., LENSES), a user can use a single video clip with multiple LENSES to see how the different LENSES will modify the stored clip. For example, multiple LENSES that apply different pseudorandom movement models can be applied to the same content by selecting different LENSES for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different LENSES will look within different windows in a display at the same time. This can, for example, enable multiple windows with different pseudorandom animations to be viewed on a display at the same time.

Data and various systems to use LENSES or other such transform systems to modify content using this data can thus involve detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g. images or frames of video). Lens data thus refers both to the images, models, and textures used to create transformations in content, as well as to additional modeling and analysis information needed to achieve such transformations with object detection, tracking, and placement.

Real time video processing can be performed with any kind of video data, (e.g. video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g. using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve: changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g. Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g. if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device and perform complex image manipulations locally on a client device such as client device 102 while maintaining a suitable user experience, computation time, and power consumption. The complex image manipulations may include size and shape changes, emotion transfers (e.g., changing a face from a frown to a smile), state transfers (e.g, aging a subject, reducing apparent age, changing gender), style transfers, graphical element application, and any other suitable image or video manipulation implemented by a convolutional neural network that has been configured to execute efficiently on a client device.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g. initiation from a content creator user interface). In various embodiments, a modification may be persistent after an initial selection of a modification icon. The user may toggle the modification on or off by tapping or otherwise selecting the face being modified by the transformation system. and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

In some example embodiments, a graphical processing pipeline architecture is provided that enables different media overlays to be applied in corresponding different layers. Such a graphical processing pipeline provides an extensible rendering engine for providing multiple augmented reality content generators that are included in a composite media (e.g., image or video) for rendering by the messaging client application 104 (or the messaging system 100).

As discussed herein, the subject infrastructure supports the creation and sharing of interactive messages with interactive effects throughout various components of the messaging system 100. In an example, to provide such interactive effects, a given interactive message may include image data along with 2D data, or 3D data. Thus, as discussed herein, an interactive message with 2D data (e.g., no depth data) may be simply referred to as an "interactive message" while a message with 3D data (e.g., depth data) may be referred to herein as a "3D message" or "interactive message with 3D data". The infrastructure as described herein enables other forms of 3D and interactive media (e.g., 2D media content that may not use depth data) to be provided across the subject system, which allows for such interactive media to be shared across the messaging system 100 and alongside photo and video messages. In example embodiments described herein, messages can enter the system from a live camera or via from storage (e.g., where messages with 2D or 3D content or augmented reality (AR) effects (e.g., 3D effects using depth data, or other interactive effects that may not use depth data) are stored in memory or a database). In an example of an interactive message with 3D data, the subject system supports motion sensor input and manages the sending and storage of depth data, and loading of external effects and asset data.

As mentioned above, an interactive message includes an image in combination with a 2D effect, and an interactive message with 3D data includes an image in combination with a 3D effect and depth data. In an example embodiment, a message is rendered using the subject system to visualize the spatial detail/geometry of what the camera sees, in addition to a traditional image texture. When a viewer interacts with this message by moving a client device, the movement triggers corresponding changes in the perspective the image and geometry are rendered at to the viewer.

In an embodiment, the subject system provides AR effects (which may include 3D effects using depth data, or interactive 2D effects that do not use depth data) that work in conjunction with other components of the system to provide particles, shaders, 2D assets and 3D geometry that can inhabit different depth-planes within messages. In an example, this enables the subject system to provide augmented reality content generators and effects that have occlusion and respond to the interactions of the user (e.g., as detected through motion sensor data) by changing the physical placement and visual appearance of the assets in such messages. The AR effects as described herein, in an example, are rendered in a real-time manner for the user, which also enables different particles and layers to be placed in different positions for each user who views such particles and layers.

As discussed herein, a 2D attachment or 3D attachment refers to images (e.g., sprites) or geometry that can be attached to a 3D effect in a similar manner to being attached to a lens.

As described herein, face effects refer to beautification, face retouch, stretching and other effects that can be applied to an image containing a face in order to deform or beautify the face through a lens and/or other augmented reality content generator (e.g., providing an augmented reality experience).

One example of such a beautification operation includes face retouching which includes a number of features to retouch the user's face such as softening skin, teeth whitening, eye sharpening and eye whitening. Another example of a beautification operation includes a face stretch effect that enables stretching points of the user's face. Yet another example of a beautification operation includes changing the color of the user's eyes and/or creating eye reflections. Another example of a beautification operation includes a face liquify effect that spherically warps the face. Another example of a beautification operation includes a face inset effect that maps a feature of the face (e.g., eyes) to other areas of the face. It is appreciated that other types of beautification techniques are contemplated and within the scope of the subject system.

The beautification operation can modify the image data to increase skin smoothness, adjust lighting, and modify color in the facial image data. Example approaches to achieve the aforementioned image effects include using portrait division, portrait fusion, color correction, Gaussian mixture model (GNIM), Gaussian filter, Bayesian segmentation, skin color detection, bilateral filter, HSV color descriptor, wavelet transform, gradient domain image processing, Poisson image cloning, Lee filter, edge-preserving smoothing filter, blurring, noise reduction, blemish removal, feature detection and extraction, and the like. Other approaches may be utilized by the subject technology to perform a given beautification operation. For instance, machine learning models can be applied in a beautification operation such as convolutional neural networks, generative adversarial networks, and the like. Such machine learning models can be utilized to preserve facial feature structures, smooth blemishes or remove wrinkles, or preserve facial skin texture in facial image data.

As mentioned herein, a gyro-based interaction refers to a type of interaction in which a given client device's rotation is used as an input to change an aspect of the effect (e.g. rotating phone along x-axis in order to change the color of a light in the scene).

As mentioned herein, a 3D augmented reality content generator refers to a real-time special effect and/or sound that may be added to a message and modifies image and/or depth data with a AR effects and/or other 3D content such as 3D animated graphical elements, and the like.

In an embodiment, when a user initiates a capture of a message with 3D content (e.g., a 3D message), the subject system applies a bundled or dynamic depth effect lens using mesh generated based on depth information and a camera image.

In an embodiment, there are two example scenarios for recreating an interactive message (e.g., with 2D data or 3D data) for viewing:

Sending: when sending an interactive message (e.g., with 2D data or 3D data), the sender produces a number of assets which accompany the message with the image data. These assets are not the same as the raw inputs, but rather are assets which have been generated by the sender AR content generator in order to capture the results of the AR content processing.

Storing the interactive message: when storing the interactive message, the subject system enables a user to re-create the AR effect(s) from "scratch" and switch to different AR effects. To achieve this, the subject system stores the raw inputs, which enables the system to start from "scratch" again.

The following discussion relates to example data that is stored in connection with such a message in accordance to some embodiments.

Figure 6:
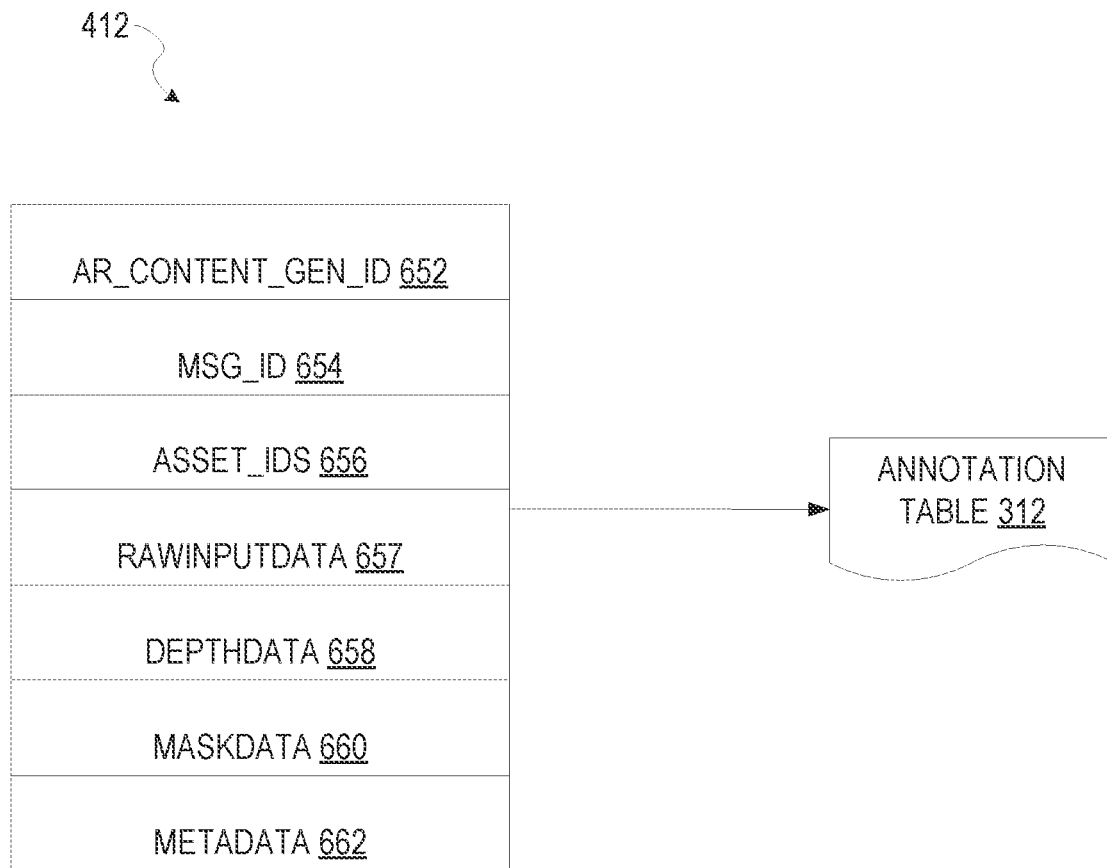
FIG. 6 is a schematic diagram illustrating a structure of the message annotations, as described in FIG. 4, including additional information corresponding to a given message, according to some embodiments.

FIG. 6 is a schematic diagram illustrating a structure of the message annotations 412, as described above in FIG. 4, including additional information corresponding to a given message, according to some embodiments, generated by the messaging client application 104. In an embodiment, the content of a particular message 400 including the additional data shown in FIG. 6 is used to populate the message table 314 stored within the database 120 for a given message, which is then accessible by the messaging server application 114 and/or the messaging client application 104. As illustrated in an example embodiment, message annotations 412 includes the following components corresponding to data for a message:

- augmented reality content generator identifier 652: identifier of an augmented reality content generator (e.g., animation and/or effect, including a 3D effect, LENSES, filter, and the like) utilized in the message
- message identifier 654: identifier of the message
- asset identifiers 656: a set of identifiers for assets in the message. For example, respective asset identifiers can be included for a number of assets that is determined by the particular 3D augmented reality content generator. In an embodiment, such assets are created by the 3D augmented reality content generator on the sender side, uploaded to the messaging server application 114, and utilized by the 3D augmented reality content generator on the receiver side in order to recreate the message. Examples of typical assets include:
- raw input data 657:
  - The original still RGB image captured by the camera
  - A combined depth map and portrait segmentation mask, which provides a 3D capture of the user separated from their background. In an embodiment and described further herein, this is generated by render passes in the 3D augmented reality content generator from the raw depth data and portrait segmentation mask provided by the device camera, which can be packed into a multichannel image (e.g., RGB channels with alpha channel) for transmission
  - A blurred background image to place behind the 3D user capture. In an embodiment, this is generated by render passes in the lens making use of the portrait segmentation mask to perform inpainting of image content behind the user
  - 3D depth data (mentioned further below)
  - portrait segmentation mask (mentioned further below)
- depth data 658: raw depth data (e.g., 640×360 with 16 bit) and/or a depth map
- mask data 660: data corresponding to a portrait segmentation mask based on the raw depth data and/or depth map
- metadata 662 corresponding to additional metadata including, but not limited to, the following:
  - a message metadata appended to camera image metadata
  - camera intrinsic data
    - focal length
    - principal point
  - camera extrinsic data
    - quaternion indicating rotation between two cameras
    - translation between two cameras
    - other camera information (e.g., camera position)
  - media attribute to indicate message has depth
  - augmented reality content generator asset metadata corresponding to an augmented reality content generator
  - other additional metadata associated with the augmented reality content generator corresponding to the augmented reality content generator identifier 652, such as:
    - augmented reality content generator category: corresponding to a type or classification for a particular augmented reality content generator
    - augmented reality content generator carousel index (or other interface as discussed further below)
  - sensor information: any information provided by a sensor of the client device 102, including but not limited to the following examples:
    - gyroscopic sensor data
    - position sensor data
    - accelerometer sensor data
    - other sensor data
    - location sensor data Although not shown in FIG. 6, in an example embodiment, a given message also includes the following data (e.g., as described before in connection with FIG. 4): 1) a placeholder 2D image (e.g., a 2D photo with information corresponding to AR effects), and 2) a standard 2D overlay applied to the message (e.g., filters based on geolocation, stickers, captions, etc.). A message therefore includes, in an embodiment, a placeholder image which includes metadata corresponding to configuration data for a lens (e.g., camera intrinsic data, attached object positions) and references to stored assets in connection with the message.

In an example, the user is able to select from a number of augmented reality content generators which results in different visual treatments of the raw data provided by the camera. In an example, after an augmented reality content generator (which involves 3D data) has been selected in the messaging client application 104, the camera captures raw depth data, and the camera image. In an example, this raw data is provided to components for rendering a view of the message including the depth data. Additionally, this raw data, in an embodiment, is utilized by the message client application 104 (or component thereof) to generate a portrait segmentation mask. However, in instances in which a given augmented reality content generator does not utilize 3D effects or 3D data and is interactive, the camera can capture an image or multiple images to render a view of the message (e.g., without the aforementioned depth data).

In an example, depending on the relative position of the client device with respect to a viewing user, 3D effects can be updated for presentation on the display of the client device taking into account the change in position. For example, if the display of the client device is tilted in a particular manner to a first position, one set of 3D effects may be rendered and provided for display, and when the client device is moved to a different position, a second set of 3D effects may be rendered to update the image and indicate a change in viewing perspective, which provides a more 3D viewing experience to the viewing user.

The following examples are performed by a given client device as part of generating a given 3D message using at least raw input data (e.g., image data and depth data) provided by a camera of the client device.

In a first example, a raw depth map is generated by a given client device (e.g., the client device 102) based on raw data captured by the camera of the client device. Such raw data may include image data (e.g., photo image) and depth data from the camera. In an example, the client device converts a single channel floating point texture into a raw depth map that enables multiple passes of processing without losing precision. The client device can spread (e.g., send or transform portions of data) the single channel floating point, texture into multiple lower precision channels which is illustrated in a second example as a packed depth map. In an embodiment, the raw depth map and the packed depth map have a lower resolution (e.g., lower number of total pixels) than the raw image data captured by the camera of the client device.

The client device performs operations to separate a foreground with a given subject (e.g., portrait of a user) in a given image from a background in the same image. In an embodiment, the client device generates a segmentation mask using at least the raw depth map or the packed depth map described above. Alternatively, in an example, a segmentation mask may be included in the raw data captured by the camera when the capabilities of the client device include generating the segmentation mask as part of the image capturing process.

Using the segmentation mask, the client device performs a diffusion based inpainting technique to remove the foreground subject from the background in the image, thereby generating a background inpainting image (e.g., without the foreground subject). In an example, a diffusion based inpainting technique attempts to in a missing region (e.g., the foreground subject) by propagating image content from the boundary to an interior of the missing region. Removing the foreground subject in this manner is advantageous at least because, after rendering the 3D message, when the camera of the client device is moved, it is possible that a "ghost" of the (portion of) image of the subject is seen in the background (e.g., resulting in an undesirable visual effect) when the foreground subject is not removed (e.g., when not performing the above operations).

Further, after rendering the 3D message, when the client device is moved and in areas of the image with (large) changes in depth (e.g., between the foreground and background corresponding to a portion of a side of a user's face), if the segmentation mask and inpainting techniques are not performed as described herein, stretching artifacts can appear in the portion of the image with a user's face, and a boundary of the user's face or head can appear smeared between the foreground and background of the image. Moreover, without performing techniques described herein, a hard (e.g., visually pronounced) boundary between the foreground and the background of the image can appear as an unwanted visual effect when the client device is moved, making the image appear more artificial, unrealistic, distorted, and exaggerated.

In an embodiment, the client device performs, using a depth inpainting mask, the same diffusion based inpainting technique (e.g., as discussed above with respect to background inpainting) to extend the foreground boundaries of the depth map (e.g., the packed depth map). In a first example, a depth inpainting mask is generated using at least the depth map. In an example, the depth inpainting mask can be determined using approaches applied on the depth map including boundary detection, and machine learning techniques such as deep convolutional neural networks that perform classifications of each pixel in the depth map, encoder-decoder architecture for segmentation, fully convolutional networks, feature maps, deconvolutional networks, unsupervised feature learning, and the like.

In a second example, image data (e.g., an inpainted depth map) includes a result of inpainting of the depth map using the depth inpainting mask. This is performed, in an example, to improve the appearance (e.g., more accurately render) of hair, ears, or shoulders. As mentioned before, the depth map can be lower resolution than the image data (e.g., the RBG image) and 3D effects or image processing operations applied to the depth map may be limited by the lower resolution. To better preserve fine details such as hair, the aforementioned depth map inpainting technique is provided by the subject technology. By using the depth map and the depth inpainting mask, the client device can determine and fill particular regions of the image (e.g., regions with missing or bad data).

In an example, the client device determines a depth map based at least in part on the depth data, generates a depth inpainting mask corresponding to a region of the depth map including facial depth data; and performs depth map inpainting of the depth map using at least the generated depth inpainting mask. The depth map could be a packed depth map in an embodiment.

In an embodiment, the client device generates a depth normal map by determining a plane fitting around a neighborhood of each depth pixel in the depth map. This is advantageous for determining how light should interact with the surface e.g., to achieve interesting lighting effects and beautification effects. In an example, the generated depth normal map is a low resolution image but can be effectively utilized to provide such effects in the 3D message. In an example, a normal map uses RGB information (e.g., corresponding with the X, Y and Z axis in 3D space), and the RGB information can be utilized by the client device to determine the direction that surface normals (or "normals") are oriented in for each polygon, where the client device uses the determined orientation of the surface normals to determine how to shade the polygon. Stated in another way, a normal map is an image that stores a direction at each pixel, and the directions are called normals. The red, green, and blue channels of the image can be used by the client device to control the direction of a normal of each pixel, and the normal map can be used to mimic high-resolution details on a low-resolution image.

In an example, the client device generates a normal map of the depth map for applying a lighting effect to facial image data of the image data, and applies the lighting effect to the facial image data based at least in part on the normal map. In an example, the lighting effect includes at least two different colors, a first color from the two different colors being applied to a first portion of the facial image data, and a second color from the two different colors being applied to a second image of the facial image data.

Using the generated normal map, the client device can apply beautification techniques (discussed further herein), lighting effects, and other image processing techniques to produce 3D effects that are convincing and natural looking to a viewing user of the 3D message. The client device generates a post-processed foreground image based at least on the aforementioned techniques involving the generated normal map.

The client device generates a 3D message that includes various assets such as the post-processed foreground image, the post-processed depth map, the inpainted background image, and other metadata included (e.g., as discussed before). In an embodiment, a receiving device of the 3D message can utilize the included assets to render a view of the 3D message by generating a foreground mesh and a background mesh. The foreground mesh can be generated using the post-processed depth map and metadata related to camera intrinsic metadata (e.g., lens information, and the like as discussed before). The background mesh can be generated using at least the inpainted background image.

In an embodiment, an augmented reality content generator includes logic for generating assets, which are uploaded to the messaging server application 114, and other data (anything else which the receiver (e.g., a different client device from the client device 102, or the client device 102 when receiving from the different client device) needs in order to rebuild the effect e.g. field of view information, configuration parameters, etc.), which is attached to the message.

In an example, a sender (e.g., client device 102) generates a standard 2D image message to which augmented reality content generator metadata is included that contains information utilized by the receiver to reconstruct the 3D message. This includes the ID of the 3D message augmented reality content generator (e.g., the receiver also downloads and executes the same augmented reality content generator that was used by the sender), a 3D message ID (e.g., to associate all assets with this particular 3D message), and the assets IDs and configuration data produced by the 3D augmented reality content generator itself, including arbitrary structured data embedded directly in the metadata (e.g., numbers, text, vectors and matrices) and any number of asset IDs referencing larger assets stored in the messaging server application 114 (e.g., images, videos, 3D meshes).

In an embodiment, facial data processing occurs only on the sender side. The results of this processing are then stored as configuration data by the 3D message augmented reality content generator (for example, the 3D transform of the head as a transformation matrix), and on the receiver side this configuration data is retrieved and used (e.g., the receiver does not re-process facial data from the original image).

As an example, the receiver receives a standard 2D image message, but because of the presence and content of the augmented reality content generator metadata, the receiver reconstructs a 3D message based on such metadata. This involves first fetching the 3D message augmented reality content generator using its ID, and then fetching all assets associated with the 3D message ID. The receiver loads the 3D message augmented reality content generator, and the augmented reality content generator itself contains the logic for requesting the appropriate assets and data and reassembling the 3D message. In an example, the 3D message assets will not include information for performing additional processing with respect to a given media overlay, so for example if a sticker (e.g., overlaid image) has been applied on top of the 3D message, the receiver will receive the underlying unobscured 3D message assets, and the sticker will be applied by the receiver as a media overlay.

Figure 7:
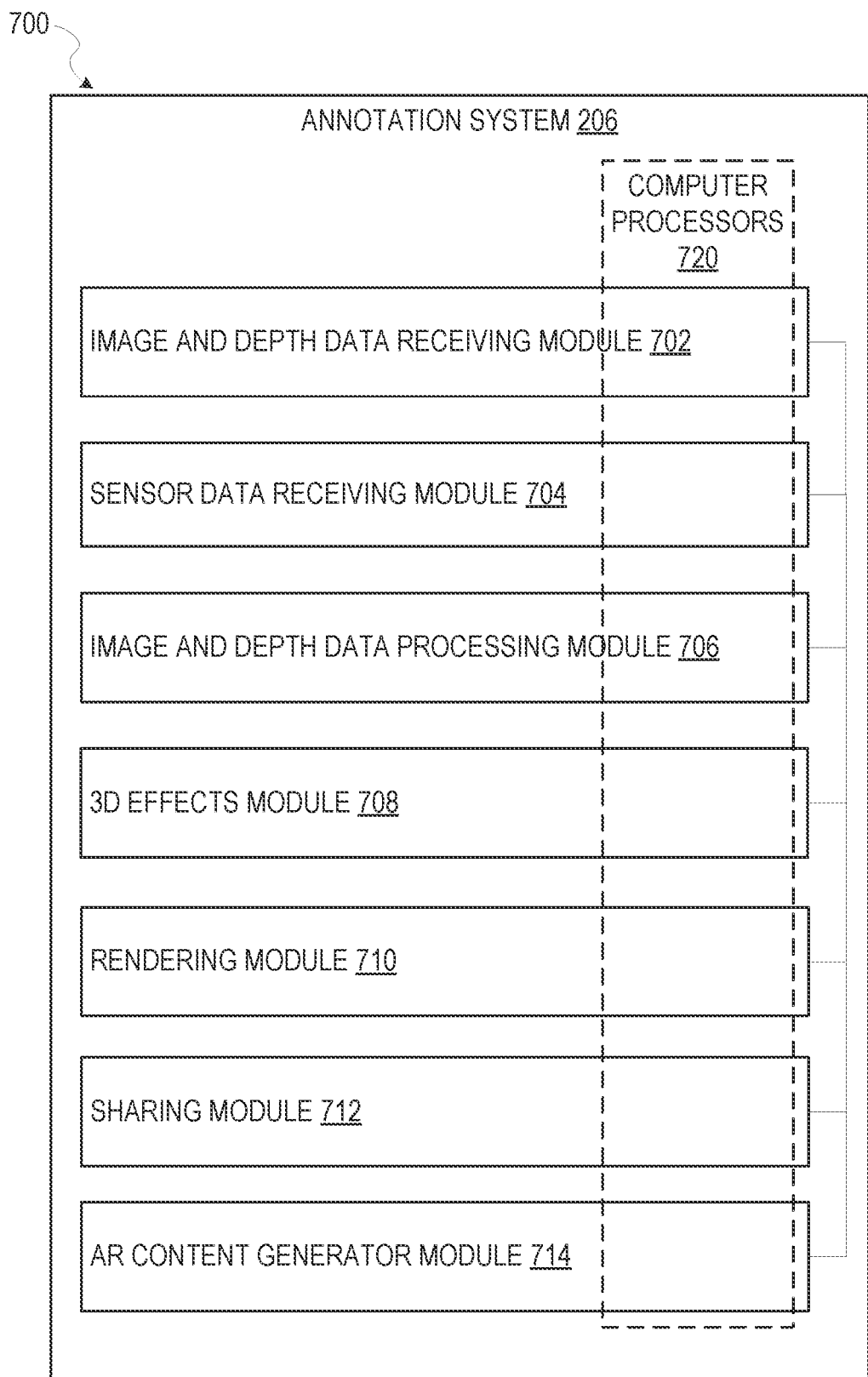
FIG. 7 is a block diagram illustrating various modules of an annotation system, according to certain example embodiments.

FIG. 7 is a block diagram 700 illustrating various modules of an annotation system 206, according to certain example embodiments. The annotation system 206 is shown as including an image and depth data receiving module 702, a sensor data receiving module 704, an image and depth data processing module 706, an augmented reality (AR) effects module 708, a rendering module 710, and a sharing module 712. The various modules of the annotation system 206 are configured to communicate with each other (e.g., via a bus, shared memory, or a switch). Any one or more of these modules may be implemented using one or more computer processors 720 (e.g., by configuring such one or more computer processors to perform functions described for that module) and hence may include one or more of the computer processors 720 (e.g., a set of processors provided by the client device 102).

Any one or more of the modules described may be implemented using hardware alone (e.g., one or more of the computer processors 720 of a machine (e.g., machine 1700) or a combination of hardware and software. For example, any described module of the annotation system 206 may physically include an arrangement of one or more of the computer processors 720 (e.g., a subset of or among the one or more computer processors of the machine (e.g., machine 1700) configured to perform the operations described herein for that module. As another example, any module of the annotation system 206 may include software, hardware, or both, that configure an arrangement of one or more computer processors 720 (e.g., among the one or more computer processors of the machine (e.g., machine 1700) to perform the operations described herein for that module. Accordingly, different modules of the annotation system 206 may include and configure different arrangements of such computer processors 720 or a single arrangement of such computer processors 720 at different points in time. Moreover, any two or more modules of the annotation system 206 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The image and depth data receiving module 702 receives images and depth data captured by a client device 102. For example, an image is a photograph captured by an optical sensor (e.g., camera) of the client device 102. An image includes one or more real-world features, such as a user's face or real-world object(s) detected in the image. In some embodiments, an image includes metadata describing the image. For example, the depth data includes data corresponding to a depth map including depth information based on light rays emitted from a light emitting module directed to an object (e.g., a user's face) having features with different depths (e.g., eyes, ears, nose, lips, etc.). By way of example, a depth map is similar to an image but instead of each pixel providing a color, the depth map indicates distance from a camera to that part of the image (e.g., in absolute terms, or relative to other pixels in the depth map).

The sensor data receiving module 704 receives sensor data from a client device 102. Sensor data is any type of data captured by a sensor of the client device 102. In an example, sensor data can include motion of the client device 102 gathered by a gyroscope, touch inputs or gesture inputs from a touch sensor (e.g., touchscreen), GPS, or another sensor of the client device 102 that describes a current geographic location and/or movement of the client device 102. As another example, sensor data may include temperature data indicating a current temperature as detected by a sensor of the client device 102. As another example, the sensor data may include light sensor data indicating whether the client device 102 is in a dark or bright environment.

The image and depth data processing module 706 performs operations on the received image and/or depth data.

For example, various image processing and/or depth processing operations are performed by the image and depth data processing module 706, which are discussed further herein.

The AR effects module 708 performs various operations based on algorithms or techniques that correspond to animations and/or providing visual and/or auditory effects to the received image and/or depth data, which is described further herein. In an embodiment, a given augmented reality content generator can utilize the AR effects module 708 to perform operations to render AR effects (e.g., including 2D effects or 3D effects using depth data) and the like.

The rendering module 710 performs rendering of the message for display by the messaging client application 104 based on data provided by at least one of the aforementioned modules. In an example, the rendering module 710 utilizes a graphical processing pipeline to perform graphical operations to render the message for display. The rendering module 710 implements, in an example, an extensible rendering engine which supports multiple image processing operations corresponding to respective augmented reality content generators.

In some implementations, the rendering module 710 provide a graphics system that renders two-dimensional (2D) objects or objects from a three-dimensional (3D) world (real or imaginary) onto a 2D display screen. Such a graphics system (e.g., one included on the client device 102) includes a graphics processing unit (GPU) in some implementations for performing image processing operations and rendering graphical elements for display.

In an implementation, the GPU includes a logical graphical processing pipeline, which can receive a representation of a 2D or 3D scene and provide an output of a bitmap that represents a 2D image for display. Existing application programming interfaces (APIs) have implemented graphical pipeline models. Examples of such APIs include the Open Graphics Library (OPENGL) API and the METAL API. The graphical processing pipeline includes a number of stages to convert a group of vertices, textures, buffers, and state information into an image frame on the screen. In an implementation, one of the stages of the graphical processing pipeline is a shader, which may be utilized as part of a particular augmented reality content generator that is applied to an input frame (e.g., image or video). A shader can be implemented as code running on a specialized processing unit, also referred to as a shader unit or shader processor, usually executing several computing threads, programmed to generate appropriate levels of color and/or special effects to fragments being rendered. For example, a vertex shader processes attributes (position, texture coordinates, color, etc.) of a vertex, and a pixel shader processes attributes (texture values, color, z-depth and alpha value) of a pixel. In some instances, a pixel shader is referred to as a fragment shader.

It is to be appreciated that other types of shader processes may be provided. In an example, a particular sampling rate is utilized, within the graphical processing pipeline, for rendering an entire frame, and/or pixel shading is performed at a particular per-pixel rate. In this manner, a given electronic device (e.g., the client device 102) operates the graphical processing pipeline to convert information corresponding to objects into a bitmap that can be displayed by the electronic device.

The sharing module 712 generates the message for storing and/or sending to the messaging server system 108. The sharing module 712 enables sharing of messages to other users and/or client devices of the messaging server system 108.

The augmented reality content generator module 714 cause display of selectable graphical items that, in an embodiment, are presented in a carousel arrangement. By way of example, the user can utilize various inputs to rotate the selectable graphical items onto and off of the display screen in manner corresponding to a carousel providing a cyclic view of the graphical items. The carousel arrangement allows multiple graphical items to occupy a particular graphical area on the display screen. In an example, augmented reality content generators can be organized into respective groups for including on the carousel arrangement thereby enabling rotating through augmented reality content generators by group.

In a given message, a 3D model of the subject or scene can be captured using the embodiments described herein. Such a 3D model can be combined with an augmented reality content generator(s) e.g., (LENSES and AR effects) and shared within the subject system, offering additional elements of interactivity for the viewer.

In embodiments described herein, by using depth and image data, 3D face and scene reconstruction can be performed that adds a Z-axis dimension (e.g., depth dimension) to a traditional 2D photos (e.g., X-axis and Y-axis dimensions). This format enables the viewer to interact with the message, changing the angle/perspective in which the message is rendered by the subject system, and affecting particles and shaders that are utilized in rendering the message.

In an example, viewer interaction input comes from movement (e.g., from a movement sensor of the device displaying the message to the viewer) whilst viewing the message, which in turn is translated to changes in perspective for how content, particles and shaders are rendered. Interaction can also come from onscreen touch gestures and other device motion.

Figure 8:
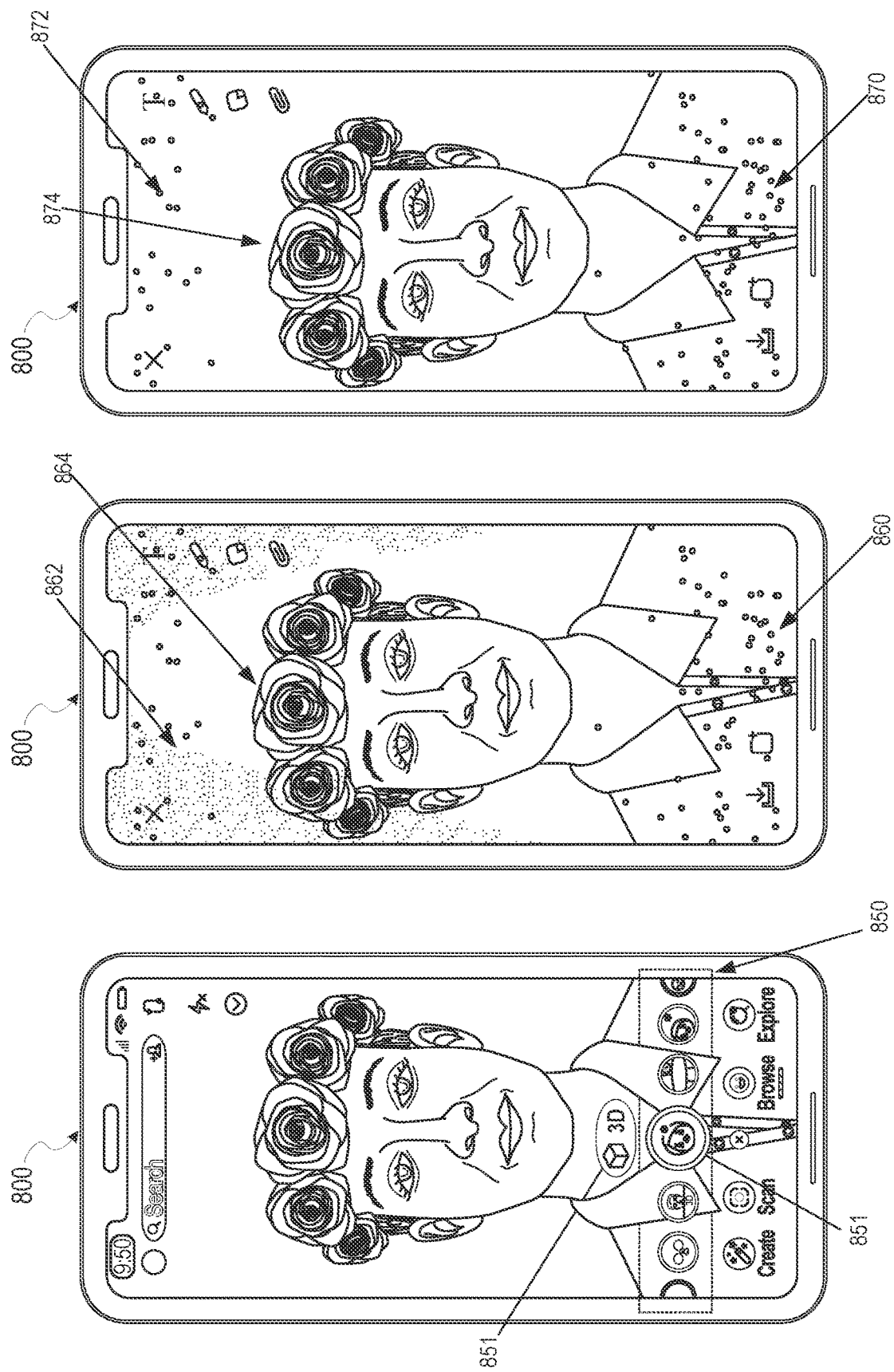
FIG. 8 illustrates example user interfaces depicting a carousel for selecting and applying a media overlay to media content (e.g., an image or video), and presenting the applied media overlay in the messaging client application (or the messaging system), according to some embodiments.

FIG. 8 illustrates example user interfaces depicting a carousel for selecting and applying an augmented reality content generator to media content (e.g., an image or video), and presenting the applied augmented reality content generator in the messaging client application 104 (or the messaging system 100), according to some embodiments.

In embodiments of such user interfaces, selectable graphical items 850 may be presented in a carousel arrangement in which a portion or subset of the selectable graphical items 850 are visible on a display screen of a given computing device (e.g., the client device 102). By way of example, the user can utilize various inputs to rotate the selectable graphical items onto and off of the display screen in manner corresponding to a carousel providing a cyclic view of the graphical items. The carousel arrangement as provided in the user interfaces therefore allow multiple graphical items to occupy a particular graphical area on the display screen.

In an example, respective AR experiences corresponding to different AR content generators can be organized into respective groups for including on the carousel arrangement thereby enabling rotating through media overlays by group. Although a carousel interface is provided as an example, it is appreciated that other graphical interfaces may be utilized. For example, a set of augmented reality content generators can include graphical list, scroll list, scroll graphic, or another graphical interface that enables navigation through various graphical items for selection, and the like. As used herein a carousel interface refers to display of graphical items in an arrangement similar to a circular list, thereby enabling navigation, based on user inputs (e.g., touch or gestures), through the circular list to select or scroll through the graphical items. In an example, a set of graphical items may be presented on a horizontal (or vertical) line or axis where each graphical item is represented as a particular thumbnail image (or icon, avatar, and the like). At any one time, some of the graphical items in the carousel interface may be hidden. If the user wants to view the hidden graphical items, in an example, the user may provide a user input (e.g., touch, gesture, and the like) to scroll through the graphical items in a particular direction (e.g., left, right, up, or down, and the like). Afterward, a subsequent view of the carousel interface is displayed where an animation is provided or rendered to present one or more additional graphical items for inclusion on the interface, and where some of the previously presented graphical items may be hidden in this subsequent view. In an embodiment, in this manner the user can navigate through the set of graphical items back and forth in a circular fashion. Thus, it is appreciated that the carousel interface can optimize screen space by displaying only a subset of images from a set of graphical items in a cyclic view.

As described herein, augmented reality content generators can included on the carousel arrangement (or another interface as discussed above) thereby enabling rotating through augmented reality content generators. Further, augmented reality content generators can be selected for inclusion based on various signals including, for example, time, date, geolocation, metadata associated with the media content, and the like. In the carousel arrangement of the user interface examples of FIG. 8, respective augmented reality content generators are selected from available augmented reality content generators provided by the subject system.

In the following discussion, the selectable graphical items correspond to respective augmented reality content generators that are applied to media content. As illustrated in user interface 800, selectable graphical items 850, corresponding to a carousel arrangement, includes a selectable graphical item 851 in the display screen of an electronic device (e.g., the client device 102). For example, a swipe gesture is received via a touch screen of the client device 102, and in response to receiving the swipe gesture, navigation through the selectable graphical items is enabled to facilitate selection of a particular augmented reality content generator. The selectable graphical item 851 is selected via a touch input (e.g., tap, or through a touch release at the end of the gesture) by the user. In this example, the selectable graphical item 851 corresponds to a particular augmented reality content generator including AR effects.

In a second example of FIG. 8, upon selection of the selectable graphical item 851, AR effects 860, AR effects 862, and AR effects 864 are rendered for display on the client device 102. In this example, the AR effects 860 are particle-based effects that are rendered spatially and are moving in response to sensor information (e.g., gyroscopic data, and the like) on the viewer's electronic device (e.g., the client device 102). The AR effects 862 can include color filtering and shader effects, which can also move in response to the sensor information. The AR effects 864 includes a 3D attachment (e.g., headband of roses). Examples of coloring filtering include a daylight effect that matches a time of day for a location corresponding to where a message is created (e.g., based on included location metadata with the message). Examples of shader effects include, but are not limited to, the following:

liquid moving around the screen
    glimmer effects
    bloom effects
    iridescent effects
    changing the background based on movement In a third example of FIG. 8, the user provides movement of the client device 102 in a display of AR effects 870 and AR effects 872 in the user interface 800. In this example, the AR effects 870, AR effects 872, and AR effects 874 are different versions, respectively, of the AR effects 860, AR effects 862, and AR effects 864 discussed in the second example. The AR effects 870, AR effects 872, and AR effects 874 have been rendered for display in response to the movement of the client device 102 (e.g., motion data from a gyroscopic sensor), and the a view of the aforementioned AR effects is updated (e.g., re-rendered) in response to newly received movement data which can change the perspective of the scene that is being viewed by the viewer. For example, the particles, color filtering, and/or 3D attachment are changed in response to movement data.

In an implementation, the aforementioned AR effects and corresponding metadata are included in a message, which can been provided (e.g., shared) with another user of the messaging system 100. This other user can receive the message, and upon being accessed, view the message for display on a receiving client device. The receiving client device, using similar or the same components as described in FIG. 7 above, renders the AR effects for display as specified in the received message. Further, this other user can provide movement to the receiving client device, which in response, initiates a re-rendering of the AR effects in which the perspective of the scene that is being viewed by the viewer is changed based on the provided movement.

Figure 9:
FIG. 9 illustrates examples of AR effects illustrating particles, and multiple frames that are rendered for display on the client device.
Figure 9:
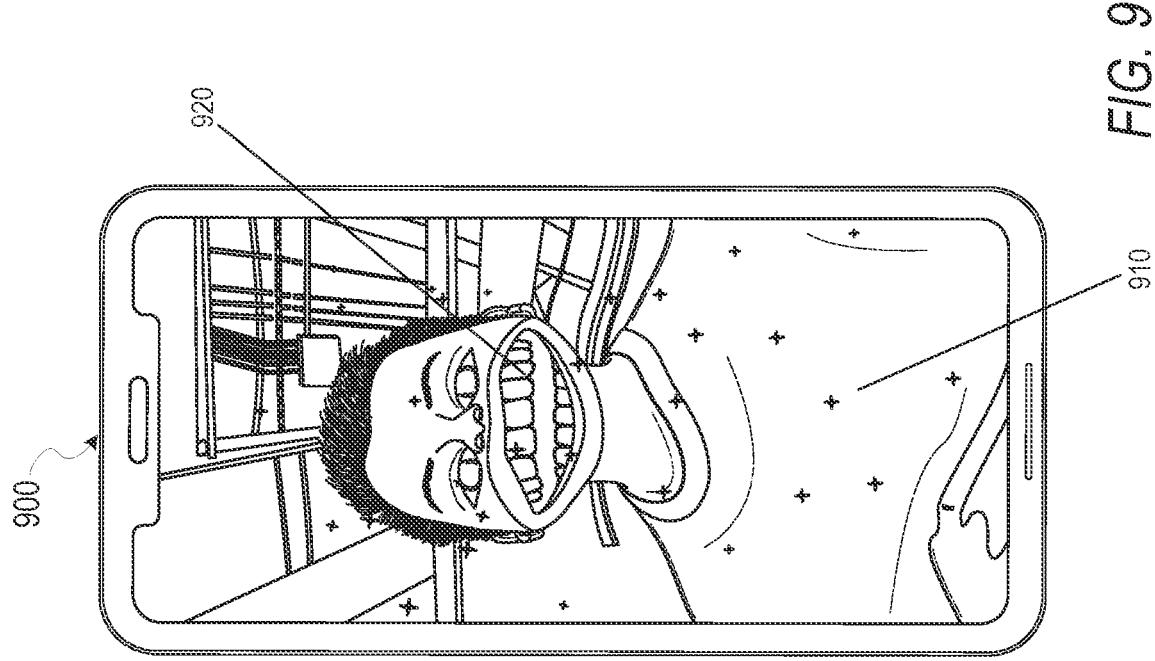

FIG. 9 illustrates examples of AR effects illustrating particles, and multiple frames that are rendered for display on the client device. It is appreciated that the examples AR effects may be provided for display, as a preview, on a sender's client device in conjunction with generating a message, or on a receiver's client device (e.g., after receiving the message created by the sender).

In a first example of FIG. 9, a view 900 of AR effects 910 and AR effects 920 are provided for display on a given client device. For example, AR effects 910 provides particles and/or sprites that are animated on the screen of the client device. As also shown, AR effects 920 enlarges a portion of image corresponding to the user's mouth.

In a second example, a view 950 of AR effects 960 and AR effects 970 are provided for display on a given client device. For example, AR effects 960 provides a first frame or shape (e.g., a rectangle) around an image of the user while also providing an animated color effect around the border of the frame. As also shown, AR effects 970 provides a second frame or shape (e.g., a second rectangle) around an second image of the user (and obscuring a portion of the first frame) while also providing an animated color effect around the border of the frame.

Figure 10:
FIG. 10 illustrates examples of AR effects showing respective 3D transformations (e.g., rippling or swirling) that is rendered for display on the client device.
Figure 10:
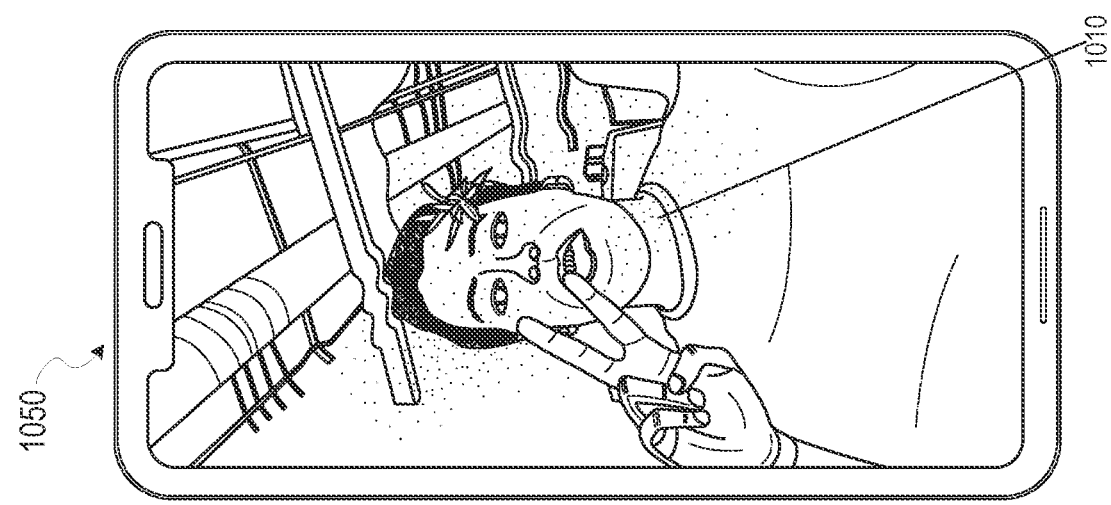
Figure 10:
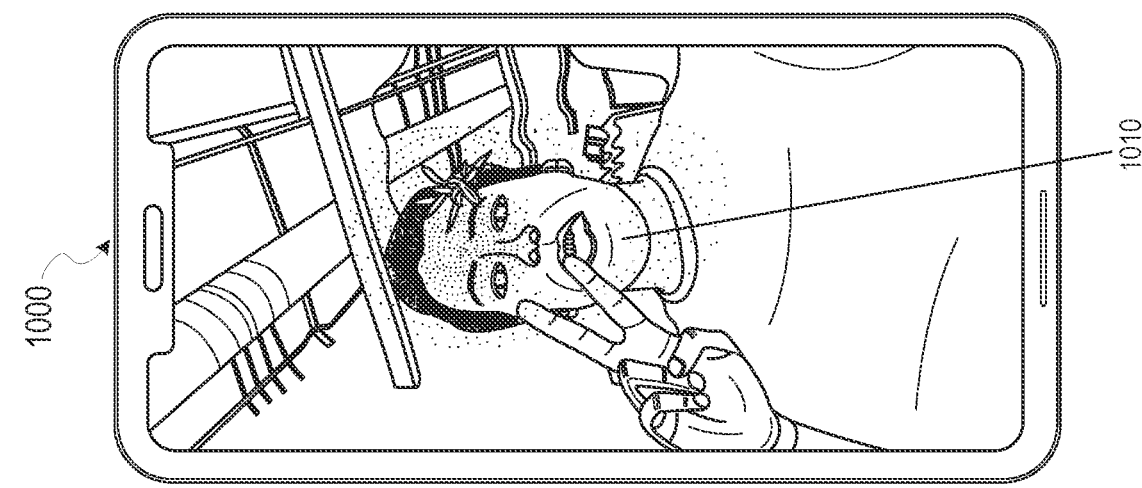

FIG. 10 illustrates examples of AR effects showing respective 3D transformations (e.g., rippling or swirling) that is rendered for display on the client device. It is appreciated that the examples AR effects may be provided for display, as a preview, on a sender's client device in conjunction with generating a message, or on a receiver's client device (e.g., after receiving the message created by the sender).

In a first example of FIG. 10, a view 1000 of AR effects 1010 is provided for display on a given client device. For example, AR effects 1010 provides a 3D transformation effect that involves an animated sprite in conjunction with a translucent swirling effect, distorting the user's face, that are animated on the screen of the client device as time progresses.

In a second example of FIG. 10, a view 1050 of AR effects 1010 is provided for display on a given client device at a subsequent time. In a third example of FIG. 10, a view 1070 of AR effects 1010 is provided for display at a second subsequent time.

Figure 11:
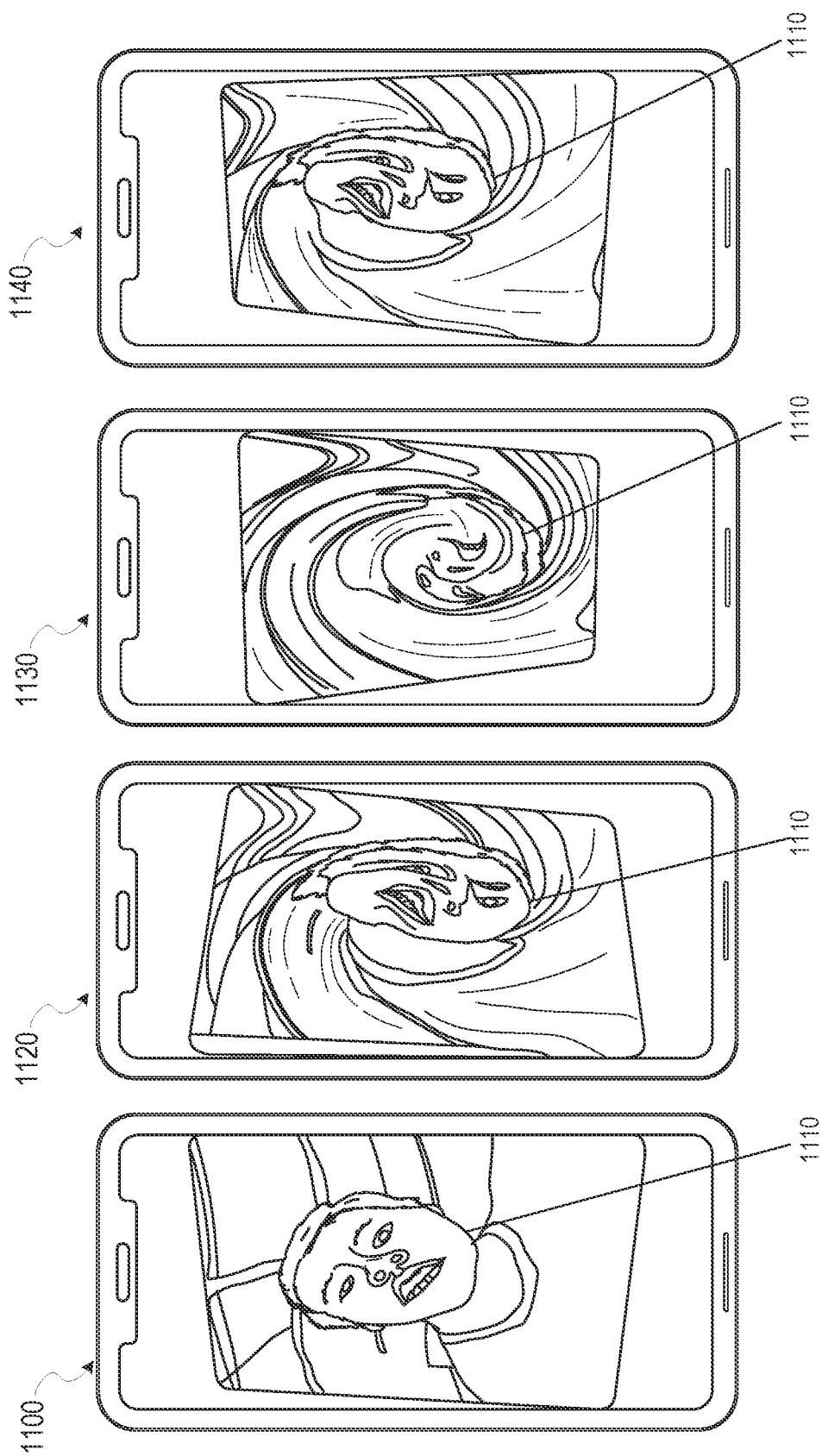
FIG. 11 illustrates examples of AR effects showing respective 3D transformations (e.g., rippling or swirling) on an animated 3D object that is rendered for display on the client device.

FIG. 11 illustrates examples of AR effects showing respective 3D transformations (e.g., rippling or swirling) on an animated 3D object that is rendered for display on the client device. It is appreciated that the examples AR effects may be provided for display, as a preview, on a sender's client device in conjunction with generating a message, or on a receiver's client device (e.g, after receiving the message created by the sender).

In a first example of FIG. 11, a view 1100 of AR effects 1010 is provided for display on a given client device. For example, AR effects 1110 provides a 3D transformation effect that involves a swirling effect, distorting the user's face, which is rendered on a surface of a 3D object, and are animated on the screen of the client device as time progresses.

In a second example of FIG. 11, a view 1120 of AR effects 1110 is provided for display on a given client device at a subsequent time. In a third example of FIG. 11, a view 1130 of AR effects 1110 is provided for display at a second subsequent time. In a fourth example of FIG. 11 a view 1140 of AR effects 1110 is provided for display at a third subsequent time. As can be seen in each of the examples, the 3D object is shown as various positions as different parts of the animation.

Embodiments of the AR effects described herein that are included in a given message can include interactive features (e.g., supported by the AR effects module 708 and/or the rendering module 710) based on various signals and other factors, which can modify the presentation of a given message when viewed by a receiving device.

Figure 12:
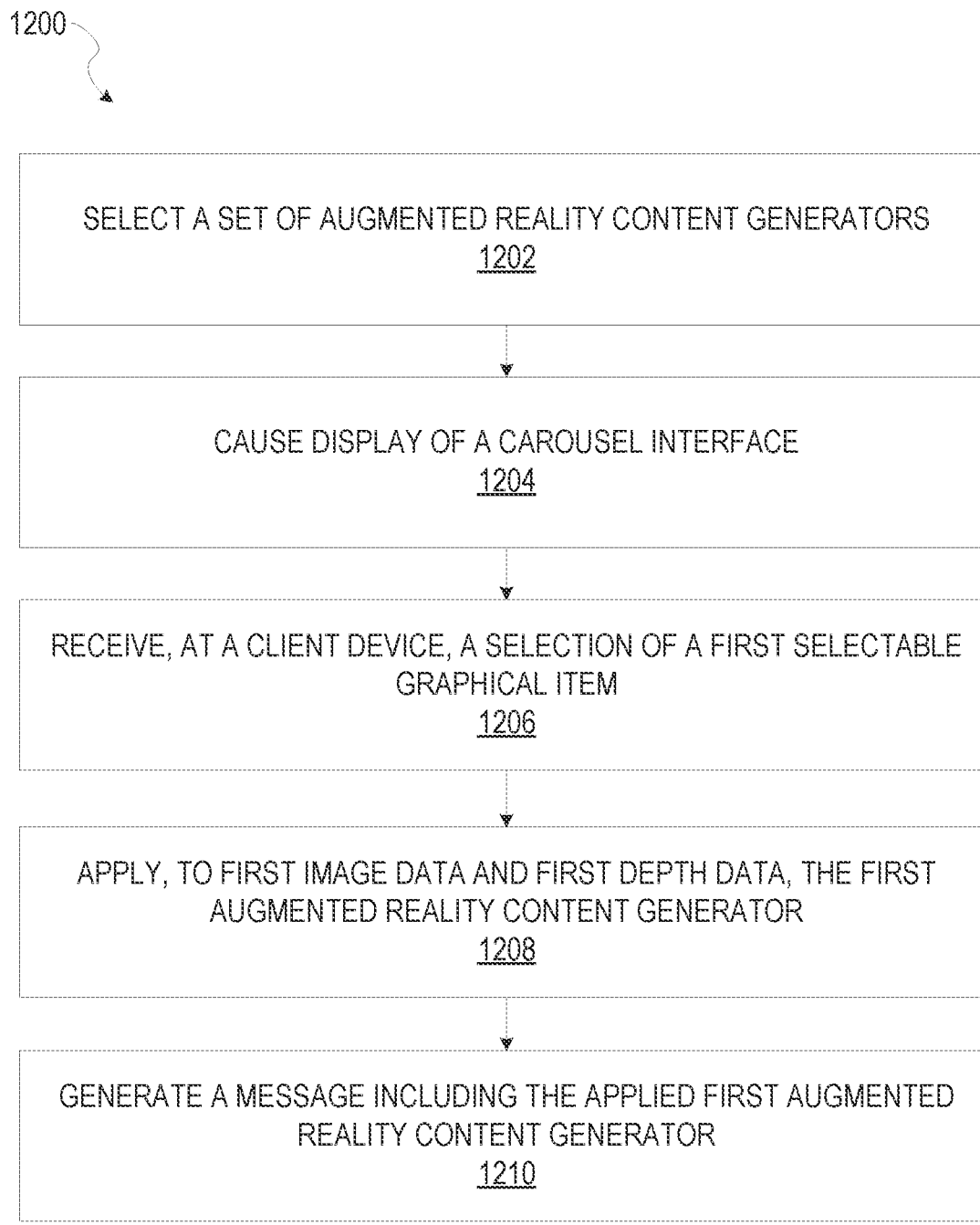
FIG. 12 is a flowchart illustrating a method to provide a carousel interface for selecting a particular media overlay with a 3D effect, according to certain example embodiments.

FIG. 12 is a flowchart illustrating a method 1200 to provide a carousel interface for selecting a particular augmented reality content generator with a 3D effect, according to certain example embodiments. The method 1200 may be embodied in computer-readable instructions for execution by one or more computer processors such that the operations of the method 1200 may be performed in part or in whole by the messaging client application 104, particularly with respect to respective components of the annotation system 206 described above in FIG. 7; accordingly, the method 1200 is described below by way of example with reference thereto. However, it shall be appreciated that at least some of the operations of the method 1200 may be deployed on various other hardware configurations and the method 1200 is not intended to be limited to the messaging client application 104.

At operation 1202, the augmented reality content generator module 714 selects a set of augmented reality content generators from available augmented reality content generators. In an example, the selected set of augmented reality content generators includes at least one augmented reality content generator for applying a three-dimensional (3D) effect.

At operation 1204, the augmented reality content generator module 714 causes display of a carousel interface including selectable graphical items (e.g., the user interface 800 as discussed before). Each selectable graphical item of the selectable graphical items corresponds to a respective augmented reality content generator of the set of augmented reality content generators.

At operation 1206, the augmented reality content generator module 714 receives, at a client device (e.g., the client device 102), a selection of a first selectable graphical item from the selectable graphical items. In an embodiment, the first selectable graphical item is a first augmented reality content generator for applying a first 3D effect.

For applying the first 3D effect, the image and depth data receiving module 702 can receive image data and depth data captured by an optical sensor (e.g., camera) of the client device 102. In an example, upon selection of the first augmented reality content generator, the camera provided by the client device commences to capture raw depth data along with the image data.

At operation 1208, the AR effects module 708 applies the selected augmented reality content generator including the 3D effect to the first image data and/or first depth data (e.g., the aforementioned captured depth and image data). In an example, the selected augmented reality content generator includes logic to enable processing the image data and/or depth data based on the 3D effect.

In an embodiment, applying the first augmented reality content generator to the first image data generates second image data. Rendering the second image data therefore can be accomplished by applying the first augmented reality content generator to the first image data in an example. Further, the AR effects module 708 causes a display of the rendered second image data in which the rendered second image data can include an interactive 3D effect as discussed herein.

At operation 1210, the sharing module 712 generates a message including the applied first augmented reality content generator (with the AR effects) to the first image data and the first depth data. As discussed before, the message may include the information described in FIG. 6 and/or FIG. 4, which enables the message to be reconstructed and rendered by a viewer of the message upon receipt of the message.

In an embodiment, the sharing module 712 stores at or sends the generated message to the messaging server system 108. In an example, the messaging client application 104 sends the message to the messaging server system 108, which enables the message to be stored and/or viewed at a later time by a particular recipient or viewer of the message.

Figure 13:
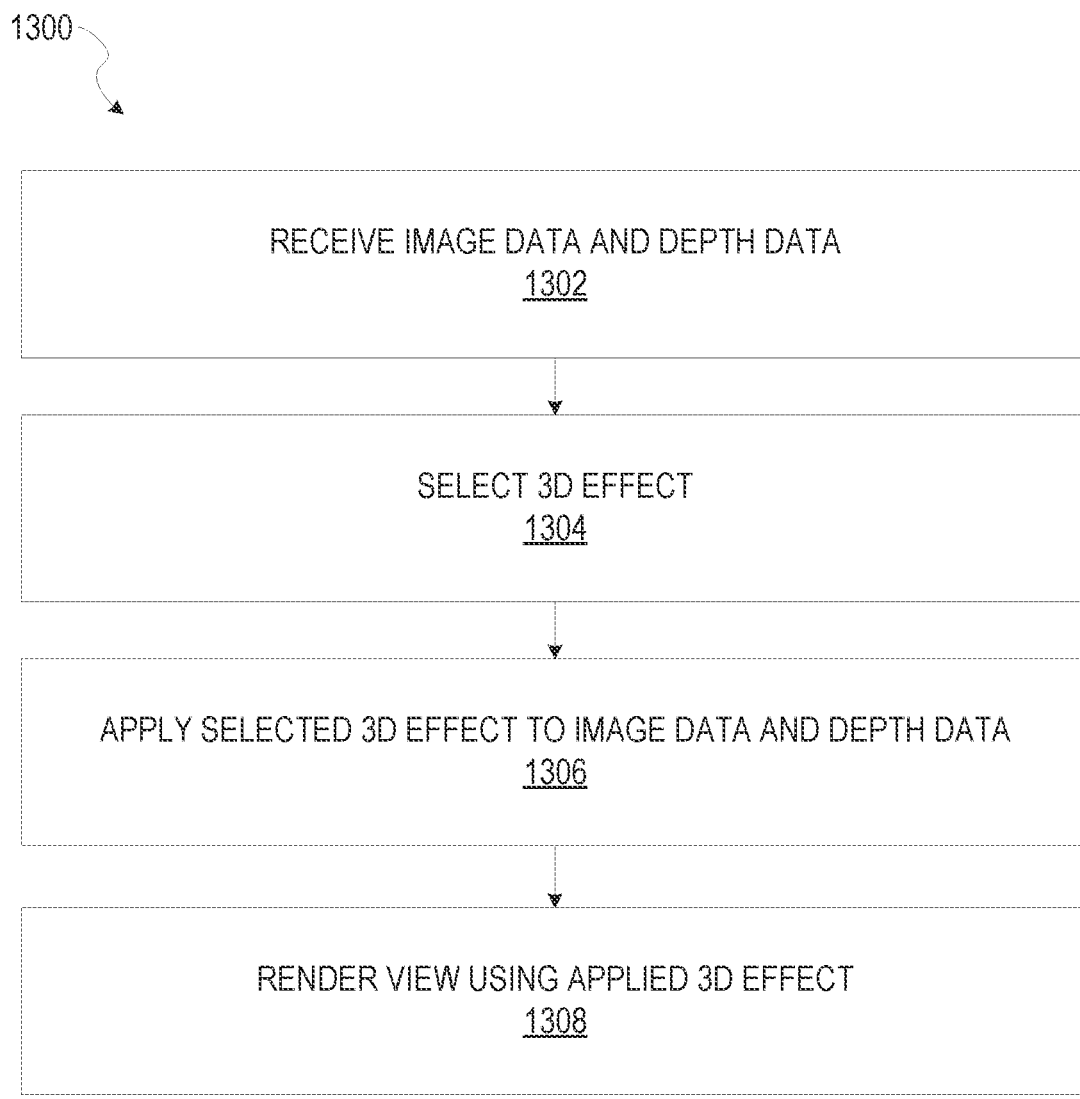
FIG. 13 is a flowchart illustrating a method to rendering a view of a message, according to certain example embodiments.

FIG. 13 is a flowchart illustrating a method 1300 to rendering a view of a message, according to certain example embodiments. The method 1300 may be embodied in computer-readable instructions for execution by one or more computer processors such that the operations of the method 1300 may be performed in part or in whole by the messaging client application 104, particularly with respect to respective components of the annotation system 206 described above in FIG. 7; accordingly, the method 1300 is described below by way of example with reference thereto. However, it shall be appreciated that at least some of the operations of the method 1300 may be deployed on various other hardware configurations and the method 1300 is not intended to be limited to the messaging client application 104. The method 1300 may be performed in conjunction with the method 1200 described above in at least one embodiment.

At operation 1302, the image and depth data receiving module 702 receives image data and depth data captured by an optical sensor (e.g., camera) of the client device 102. In an example, to create a message, the user selects an augmented reality content generator in a carousel interface as discussed before provided in the messaging client application 104, which causes the camera to capture raw depth data and along with the camera image.

At operation 1304, the AR effects module 708 selects a 3D effect. In an example, the 3D effect may be selected based on a user input corresponding to a selection of an augmented reality content generator as provided, for example, in a user interface the carousel interface described in FIG. 8) of the messaging client application 104.

At operation 1306, the AR effects module 708 applies the selected 3D effect to the image data and/or the depth data. In an example, the selected 3D effect includes logic to enable processing the image data and/or depth data.

At operation 1308, the rendering module 710 renders a view of a message using the applied 3D effect. In an example, the rendering module provides the view of the message based on the applied 3D effect, which is displayed by the messaging client application 104. As described further herein, the viewer of the message can provide additional inputs (e.g., movement data and/or touch inputs) which causes the message to be updated and re-rendered in response to such inputs.

In an embodiment, in a scenario where a given message is received (e.g., by a sender sharing the message to a receiver), similar operations described in operation 1302 to operation 1308 may be performed in order to render a view of the received message.

Figure 14:
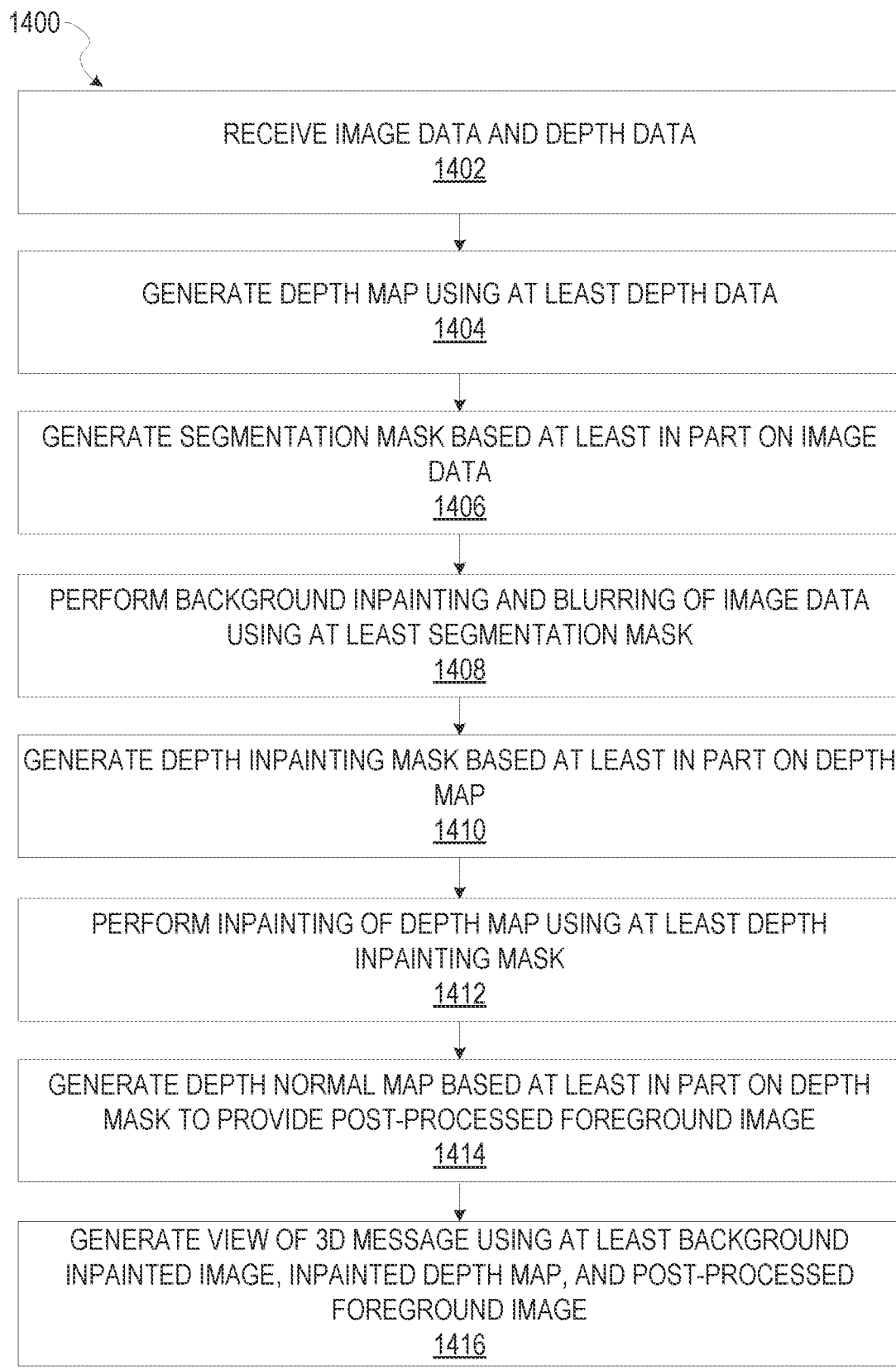
FIG. 14 is a flowchart illustrating a method of performing conversion passes for processing image and depth data which may be performed in conjunction with the method for generating a 3D message, according to some example embodiments.

FIG. 14 is a flowchart illustrating a method 1400 of performing conversion passes for processing the image and depth data which may be performed in conjunction with the method 1200 and/or method 1300 as described above, according to certain example embodiments. The method 1400 may be embodied in computer-readable instructions for execution by one or more computer processors such that the operations of the method 1400 may be performed in part or in whole by the messaging client application 104, particularly with respect to respective components of the annotation system 206 described above in FIG. 7; accordingly, the method 1400 is described below by way of example with reference thereto. However, it shall be appreciated that at least some of the operations of the method 1400 may be deployed on various other hardware configurations and the method 1400 is not intended to be limited to the messaging client application 104.

At operation 1402, the image and depth data receiving module 702 receives image data and depth data captured by an optical sensor (e.g., camera) of the client device 102. In an example, the depth data includes a depth map corresponding to the image data. In an embodiment, the image data (e.g., a color frame) is resized if a height of the image data exceeds a particular size (e.g., 2048 pixels) to improve processing utilization (e.g., for the image processing operations described further herein) and better ensure compatibility with a wider variety of client devices.

In an example embodiment, machine learning techniques and heuristics are utilized to generate depth maps in instances in which a given client device does not include appropriate hardware (e.g., depth sensing camera) that enables capture depth information. Such machine learning techniques can train a machine learning model from training data from shared 3D messages in an example (or other image data). Such heuristics include using face tracking and portrait segmentation to generate a depth map of a person.

In an example embodiment, the aforementioned machine learning techniques can utilize a neural network model to generate a depth map. For depth estimation, the input to the neural network is an RGB image and the output is a depth image. In an example, the neural network generates the depth map, which is lower resolution than the RGB image. 3D effects that are rendered using such a depth map can be limited, in an example, by the lower resolution of the depth map. In particular, fine detail (e.g., hair) can be challenging to preserve at the lower resolution of this depth map. Thus, as discussed further herein, the subject technology provides various techniques to address this potential shortcoming related to the depth map in order to generate more 3D effects that look more natural and less artificial when rendered and presented to a viewing user of the 3D message.

In an example embodiment, multi-view stereo computer vision techniques are utilized to generate depth maps from a multiple images or a video in which the user moves the camera relative to the scene.

In another embodiment, a neural network model can be utilized by the client device to generate a segmentation mask(s), which is then used to perform inpainting of a background of a given image and a corresponding depth map, which is discussed further herein.

At operation 1404, the image and depth data processing module 706 generates a depth map using at least the depth data. As discussed further below, a second depth map, referred to a packed depth map, can be generated based at least in part on the depth map for additional technical advantages.

At operation 1406, the image and depth data processing module 706 generates a segmentation mask based at least in part on the image data. In an embodiment, the image and depth data processing module 706 determines the segmentation mask using a convolutional neural network to perform dense prediction tasks where a prediction is made for every pixel to assign the pixel to a particular object class (e.g., face portrait or background), and the segmentation mask is determined based on the groupings of the classified pixels (e.g., face portrait or background). Alternatively, the segmentation mask may be received as included in the raw input data after being generated by the hardware of client device 102 (e.g., neural network processor or other machine learning oriented processor).

At operation 1408, the image and depth data processing module 706 performs background inpainting and blurring of the received image data using at least the segmentation mask to generate background inpainted image data. In an example, the image and depth data processing module 706 performs a background inpainting technique that eliminates the portrait (e.g., including the user's face) from the background and blurring the background to focus on the person in the frame. In an embodiment, some of the aforementioned processing (e.g., conversion passes) are utilized for the depth and the color textures, while other image processing are utilized for the color texture (e.g. blurring the background). In an embodiment, the processing (e.g., conversion passes) are chained for rendering to the target, and the processed depth map and color texture are rendered in a manner to be consumed by the effect(s).

At operation 1410, the image and depth data processing module 706 generates a depth inpainting mask based at least in part on the depth map. In an example, the depth map may correspond to the packed depth map mentioned before. In an example, the image and depth data processing module 706 uses the depth inpainting mask in order to clean up artifacts in the depth map. Alternatively, the image and depth data processing module 706 can instead utilize the segmentation mask mentioned above for inpainting the depth map (e.g., forego generating the depth inpainting mask).

At operation 1412, the image and depth data processing module 706 performs inpainting of the depth map using the depth inpainting mask to generate an inpainted depth map. As mentioned before, the inpainted depth map corresponds to a post-processed depth map in which artifacts, if any, have been removed from the original depth map. In an example, the post-processed depth map includes segmentation applied to an alpha channel (e.g., a channel other than channels that define color values for pixels in an image) of the depth map.

At operation 1414, the image and depth data processing module 706 generates a depth normal map based at least in part on the depth map. In an embodiment, the depth map in this operation can correspond to the packed depth map mentioned before. In an example, the image and depth data processing module 706 provides a post-process foreground image by applying, using the depth normal map, a 3D effect(s) to a foreground region of the image data.

At operation 1416, the rendering module 710 generates a view of the 3D message using at least the background inpainted image, the inpainted depth map, and the post-processed foreground image, which are assets that are included the generated 3D message. In an example, the rendering module 710 renders a view of the 3D message for display by the messaging client application 104.

Figure 15:
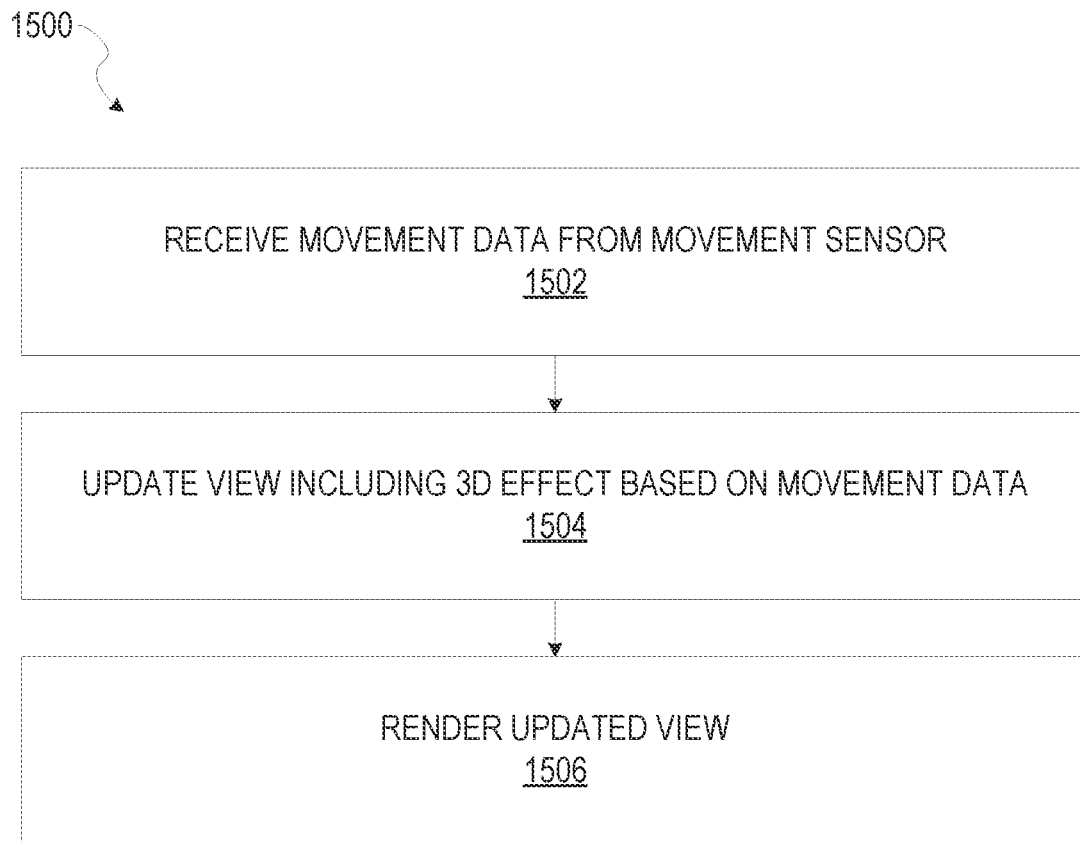
FIG. 15 is a flowchart illustrating a method of updating a view of a message in response to movement data, according to certain example embodiments.

FIG. 15 is a flowchart illustrating a method 1500 of updating a view of a message in response to movement data which may be performed in conjunction with the method 1200 and/or method 1300 and/or method 1400 as described above, according to certain example embodiments. The method 1500 may be embodied in computer-readable instructions for execution by one or more computer processors such that the operations of the method 1500 may be performed in part or in whole by the messaging client application 104, particularly with respect to respective components of the annotation system 206 described above in FIG. 7; accordingly, the method 1500 is described below by way of example with reference thereto. However, it shall be appreciated that at least some of the operations of the method 1500 may be deployed on various other hardware configurations and the method 1500 is not intended to be limited to the messaging client application 104.

At operation 1502, the sensor data receiving module 704 receives movement data from a movement sensor (e.g., gyroscope, motion sensor, touchscreen, etc.). In an embodiment, messaging client application 104 receives sensor data captured by a sensor of the client device 102, such as a location or movement sensor.

At operation 1504, the AR effects module 708 updates a view of a message based on the movement data. In an embodiment, in response to movement data corresponding to a change in roll/yaw/pitch orientation of the client device, the message has a corresponding change in how it is rendered by the AR effects module 708 (e.g., input of −10 degree roll will shift the perspective of the content +10 degree roll). In an embodiment, in response to not receiving movement data (e.g., roll/yaw/pitch) for a particular period of time 3 seconds), the AR effects module 708 updates the view of the message by showing an animation with a subtle shift to pitch, roll and yaw to demonstrate depth and parallax. Additionally, in response to movement, the aforementioned animation will stop and the response to input is processed by the AR effects module 708.

In an embodiment, as described before, additional AR effects and/or augmented reality content generators can be applied to the image and/or depth data which changes the property of both the image texture, the geometry of the depth map as well as the depth dimension in front of the reconstructed model.

At operation 1506, the rendering module 710 renders the updated view of the message.

Figure 16:
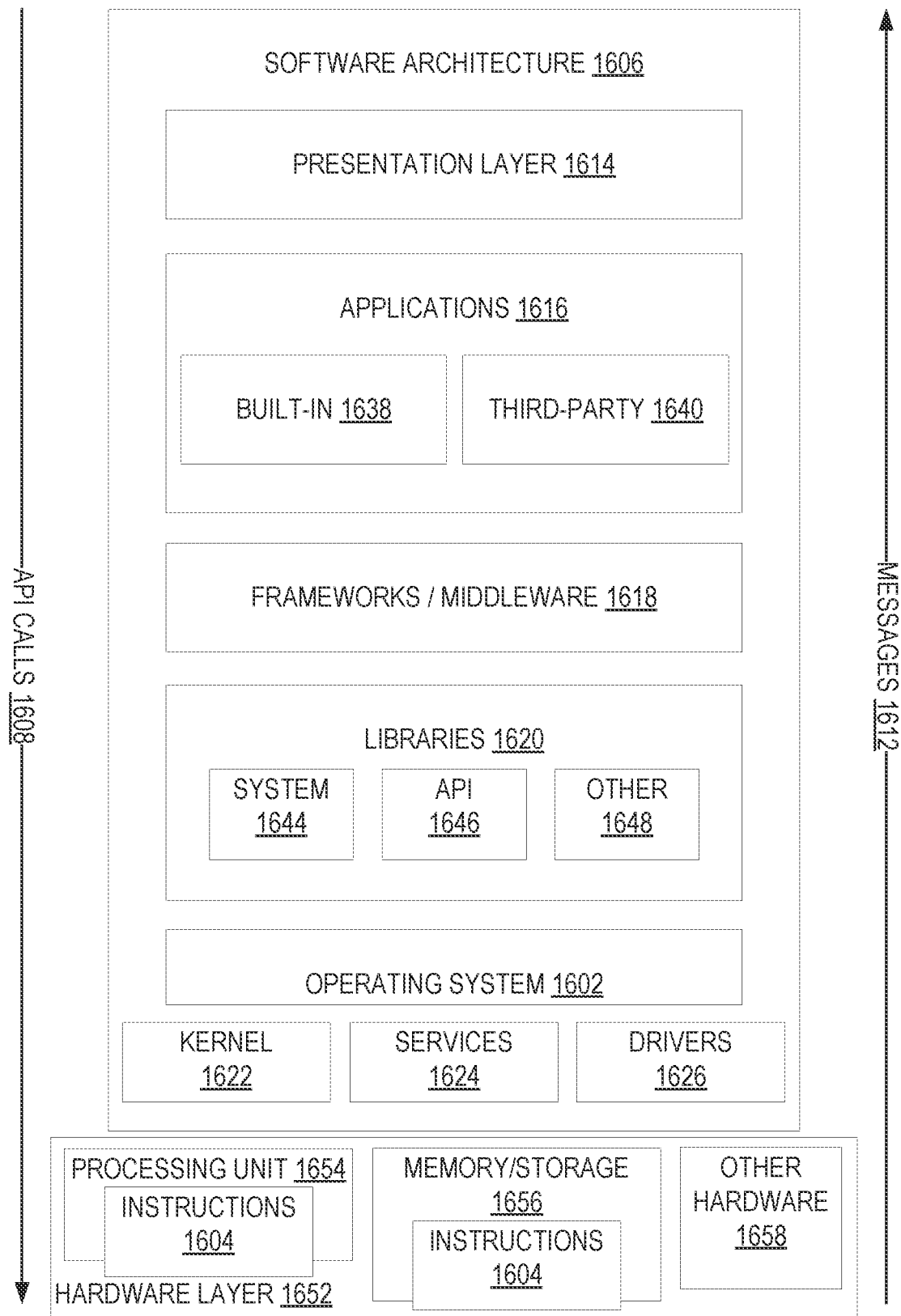
FIG. 16 is block diagram showing a software architecture within which the present disclosure may be implemented, in accordance with some example embodiments.

FIG. 16 is a block diagram illustrating an example software architecture 1606, which may be used in conjunction with various hardware architectures herein described. FIG. 16 is a non-limiting example of a software architecture and it will be appreciated that many other architectures may be implemented to facilitate the functionality described herein. The software architecture 1606 may execute on hardware such as machine 1700 of FIG. 17 that includes, among other things, processors 1704, memory 1714, and (input/output) I/O components 1718. A representative hardware layer 1652 is illustrated and can represent, for example, the machine 1700 of FIG. 17. The representative hardware layer 1652 includes a processing unit 1654 having associated executable instructions 1604. Executable instructions 1604 represent the executable instructions of the software architecture 1606, including implementation of the methods, components, and so forth described herein. The hardware layer 1652 also includes memory and/or storage modules memory/storage 1656, which also have executable instructions 1604. The hardware layer 1652 may also comprise other hardware 1658.

In the example architecture of FIG. 16, the software architecture 1606 may be conceptualized as a stack of layers where each layer provides particular functionality. For example, the software architecture 1606 may include layers such as an operating system 1602, libraries 1620, frameworks/middleware 1618, applications 1616, and a presentation layer 1614. Operationally, the applications 1616 and/or other components within the layers may invoke API calls 1608 through the software stack and receive a response as in messages 1612 to the API calls 1608. The layers illustrated are representative in nature and not all software architectures have all layers. For example, some mobile or special purpose operating systems may not provide a frameworks/middleware 1618, while others may provide such a layer. Other software architectures may include additional or different layers.

The operating system 1602 may manage hardware resources and provide common services. The operating system 1602 may include, for example, a kernel 1622, services 1624, and drivers 1626. The kernel 1622 may act as an abstraction layer between the hardware and the other software layers. For example, the kernel 1622 may be responsible for memory management, processor management (e.g., scheduling), component management, networking, security settings, and so on. The services 1624 may provide other common services for the other software layers. The drivers 1626 are responsible for controlling or interfacing with the underlying hardware. For instance, the drivers 1626 include display drivers, camera drivers. Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1620 provide a common infrastructure that is used by the applications 1616 and/or other components and/or layers. The libraries 1620 provide functionality that allows other software components to perform tasks in an easier fashion than to interface directly with the underlying operating system 1602 functionality (e.g., kernel 1622, services 1624 and/or drivers 1626). The libraries 1620 may include system libraries 1644 (e.g., C standard library) that may provide functions such as memory allocation functions, string manipulation functions, mathematical functions, and the like. In addition, the libraries 1620 may include API libraries 1646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1620 may also include a wide variety of other libraries 1648 to provide many other APIs to the applications 1616 and other software components/modules.

The frameworks/middleware 1618 (also sometimes referred to as middleware) provide a higher-level common infrastructure that may be used by the applications 1616 and/or other software components/modules. For example, the frameworks/middleware 1618 may provide various graphic user interface (GUI) functions, high-level resource management, high-level location services, and so forth. The frameworks/middleware 1618 may provide a broad spectrum of other APIs that may be used by the applications 1616 and/or other software components/modules, some of which may be specific to a particular operating system 1602 or platform.

The applications 1616 include built-in applications 1638 and/or third-party applications 1640. Examples of representative built-in applications 1638 may include, but are not limited to, a contacts application, a browser application, a book reader application, a location application, a media application, a messaging application, and/or a game application. Third-party applications 1640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1640 may invoke the API calls 1608 provided by the mobile operating system (such as operating system 1602) to facilitate functionality described herein.

The applications 1616 may use built in operating system functions (e.g., kernel 1622, services 1624 and/or drivers 1626), libraries 1620, and frameworks/middleware 1618 to create user interfaces to interact with users of the system. Alternatively, or additionally, in some systems interactions with a user may occur through a presentation layer, such as presentation layer 1614. In these systems, the application/component 'logic' can be separated from the aspects of the application/component that interact with a user.

Figure 17:
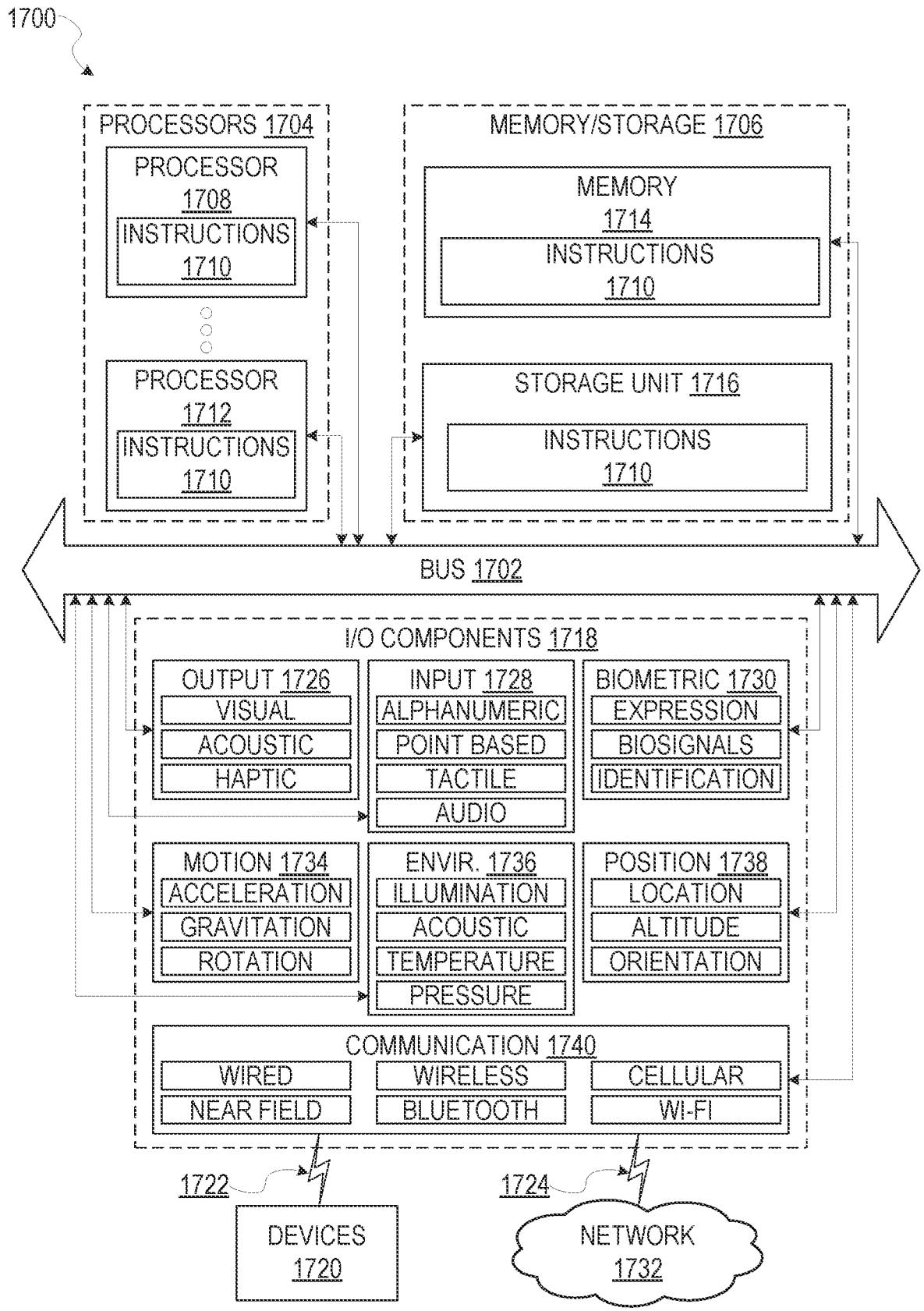
FIG. 17 is a diagrammatic representation of a machine, in the form of a computer system within which a set of instructions may be executed for causing the machine to perform any one or more of the methodologies discussed, in accordance with some example embodiments.

FIG. 17 is a block diagram illustrating components of a machine 1700, according to some example embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1710 (e.g., software, a program, an application, an apples, an app, or other executable code) for causing the machine 1700 to perform any one or more of the methodologies discussed herein may be executed. As such, the instructions 1710 may be used to implement modules or components described herein. The instructions 1710 transform the general, non-programmed machine 1700 into a particular machine 1700 programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1710, sequentially or otherwise, that specify actions to be taken by machine 1700. Further, while only a single machine 1700 is illustrated, the term 'machine' shall also be taken to include a collection of machines that individually or jointly execute the instructions 1710 to perform any one or more of the methodologies discussed herein.

The machine 1700 may include processors 1704, including processor 1708 to processor 1712, memory/storage 1706, and I/O components 1718, which may be configured to communicate with each other such as via a bus 1702. The memory/storage 1706 may include a memory 1714, such as a main memory, or other memory storage, and a storage unit 1716, both accessible to the processors 1704 such as via the bus 1702. The storage unit 1716 and memory 1714 store the instructions 1710 embodying any one or more of the methodologies or functions described herein. The instructions 1710 may also reside, completely or partially, within the memory 1714, within the storage unit 1716, within at least one of the processors 1704 (e.g., within the processor's cache memory), or any suitable combination thereof, during execution thereof by the machine 1700. Accordingly, the memory 1714, the storage unit 1716, and the memory of processors 1704 are examples of machine-readable media.

The I/O components 1718 may include a wide variety of components to receive input, provide output, produce output, transmit information, exchange information, capture measurements, and so on. The specific I/O components 1718 that are included in a particular machine 1700 will depend on the type of machine. For example, portable machines such as mobile phones will likely include a touch input device or other such input mechanisms, while a headless server machine will likely not include such a touch input device. It will be appreciated that the I/O components 1718 may include many other components that are not shown in FIG. 17. The I/O components 1718 are grouped according to functionality merely for simplifying the following discussion and the grouping is in no way limiting. In various example embodiments, the I/O components 1718 may include output components 1726 and input components 1728. The output components 1726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1718 may include biometric components 1730, motion components 1734, environmental components 1736, or position components 1738 among a wide array of other components. For example, the biometric components 1730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1734 may include acceleration sensor components (e.g., accelerometer), gravitation sensor components, rotation sensor components (e.g., gyroscope), and so forth. The environmental components 1736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1718 may include communication components 1740 operable to couple the machine 1700 to a network 1732 or devices 1720 via coupling 1724 and coupling 1722, respectively. For example, the communication components 1740 may include a network interface component or other suitable device to interface with the network 1732. In further examples, communication components 1740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1720 may be another machine or any of a wide variety of peripheral devices (e.g., a peripheral device coupled via a USB).

Moreover, the communication components 1740 may detect identifiers or include components operable to detect identifiers. For example, the communication components 1740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals).

In addition, a variety of information may be derived via the communication components 1740, such as, location via Internet Protocol UP) geo-location, location via Wi-Fi® signal triangulation, location via detecting a NFC beacon signal that may indicate a particular location, and so forth.

The following discussion relates to various terms or phrases that are mentioned throughout the subject disclosure.

'Signal Medium' refers to any intangible medium that is capable of storing, encoding, or carrying the instructions for execution by a machine and includes digital or analog communications signals or other intangible media to facilitate communication of software or data. The term 'signal medium' shall be taken to include any form of a modulated data signal, carrier wave, and so forth. The term 'modulated data signal' means a signal that has one or more of its characteristics set or changed in such a matter as to encode information in the signal. The terms 'transmission medium' and 'signal medium' mean the same thing and may be used interchangeably in this disclosure.

'Communication Network' refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

'Processor' refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as 'cores') that may execute instructions contemporaneously.

'Machine-Storage Medium' refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms 'machine-storage medium,' 'device-storage medium,' 'computer-storage medium' mean the same thing and may be used interchangeably in this disclosure. The terms 'machine-storage media,' 'computer-storage media,' and 'device-storage media' specifically exclude carrier waves, modulated data signals, and other such media, at least some of which are covered under the term 'signal medium.'

'Component' refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A 'hardware component' is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase 'hardware component'(or 'hardware-implemented component') should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, 'processor-implemented component' refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

'Carrier Signal' refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

'Computer-Readable Medium' refers to both machine-storage media and transmission media. Thus, the terms include both storage devices/media and carrier waves/modulated data signals. The terms 'machine-readable medium,' 'computer-readable medium' and 'device-readable medium' mean the same thing and may be used interchangeably in this disclosure.

'Client Device' refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network. In the subject disclosure, a client device is also referred to as an 'electronic device.'

'Ephemeral Message' refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

'Signal Medium' refers to any intangible medium that is capable of storing, encoding, or carrying the instructions for execution by a machine and includes digital or analog communications signals or other intangible media to facilitate communication of software or data. The term 'signal medium' shall be taken to include any form of a modulated data signal, carrier wave, and so forth. The term 'modulated data signal' means a signal that has one or more of its characteristics set or changed in such a matter as to encode information in the signal. The terms 'transmission medium' and 'signal medium' mean the same thing and may be used interchangeably in this disclosure.

'Communication Network' refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

'Processor' refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as 'cores') that may execute instructions contemporaneously.

'Machine-Storage Medium' refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms 'machine-storage medium,' 'device-storage medium,' 'computer-storage medium' mean the same thing and may be used interchangeably in this disclosure. The terms 'machine-storage media,' 'computer-storage media,' and 'device-storage media' specifically exclude carrier waves, modulated data signals, and other such media, at least some of which are covered under the term 'signal medium.'

'Component' refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A 'hardware component' is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase 'hardware component'(or 'hardware-implemented component') should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, 'processor-implemented component' refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

'Carrier Signal' refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

'Computer-Readable Medium' refers to both machine-storage media and transmission media. Thus, the terms include both storage devices/media and carrier waves/modulated data signals. The terms 'machine-readable medium,' 'computer-readable medium' and 'device-readable medium' mean the same thing and may be used interchangeably in this disclosure.

'Client Device' refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

'Ephemeral Message' refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

What is claimed is:
1. A method, comprising:
  selecting a set of augmented reality content generators from a plurality of available augmented reality content generators, the selected set of augmented reality content generators comprising at least one augmented reality content generator for applying a three-dimensional (3D) effect;
  causing display of a carousel interface comprising a plurality of selectable graphical items, each selectable graphical item corresponding to a respective aug- mented reality content generator of the set of augmented reality content generators;

receiving, at a client device, a selection of a first selectable graphical item from the plurality of selectable graphical items, the first selectable graphical item comprising a first augmented reality content generator for applying a first 3D effect;

generating a segmentation mask based on first image data;

applying the segmentation mask on first depth data to reduce a set of artifacts in a depth map based on the first depth data;

generating a packed depth map based at least in part on the depth map, the generating the packed depth map comprising:
  converting a single channel floating point texture to a raw depth map, and
  generating multiple channels based at least in part on the raw depth map;

applying, to the first image data and the first depth data, the first augmented reality content generator corresponding to the selected first selectable graphical item, the first image data and the first depth data being captured with a camera; and generating a message including the applied first augmented reality content generator to the first image data and the first depth data.

2. The method of claim 1, further comprising:
receiving a swipe gesture via a touch screen of the client device; and
in response to receiving the swipe gesture, causing navigation through the plurality of selectable graphical items.

3. The method of claim 1, wherein applying the first augmented reality content generator to the first image data generates second image data.

4. The method of claim 1, further comprising:
rendering second image data by applying the first augmented reality content generator to the first image data; and
causing display of the rendered second image data, the rendered second image data comprising an interactive 3D effect.

5. The method of claim 1, further comprising:
performing a background in-painting technique to eliminate a portrait from a background of the first image data.

6. The method of claim 1, wherein generating the message further includes information related to a depth map and a portrait segmentation mask.

7. The method of claim 1, wherein the first image data and the first depth data are captured by an optical sensor of a client device.

8. The method of claim 1, wherein the 3D effect comprises an image processing operation on the image data or the depth data.

9. The method of claim 1, further comprising:
rendering a view of the first image data and the first depth data based on the applied first 3D effect;
receiving movement data from a movement sensor;
updating a view of the first image data and the first depth data based at least in part on the movement data; and
rendering the updated view the first image data and the first depth data.

10. The method of claim 9, wherein the updated view and the view are different views of the applied first 3D effect.

11. A system comprising:
a processor; and
a memory including instructions that, when executed by the processor, cause the processor to perform operations comprising:
selecting a set of augmented reality content generators from a plurality of available augmented reality content generators, the selected set of augmented reality content generators comprising at least one augmented reality content generator for applying a three-dimensional (3D) effect;

causing display of a carousel interface comprising a plurality of selectable graphical items, each selectable graphical item corresponding to a respective augmented reality content generator of the set of augmented reality content generators;

receiving, at a client device, a selection of a first selectable graphical item from the plurality of selectable graphical items, the first selectable graphical item comprising a first augmented reality content generator for applying a first 3D effect;

generating a segmentation mask based on first image data;

applying the segmentation mask on first depth data to reduce a set of artifacts in a depth map based on the first depth data;

generating a packed depth map based at least in part on the depth map, the generating the packed depth map comprising:
  converting a single channel floating point texture to a raw depth map, and
  generating multiple channels based at least in part on the raw depth map;

applying, to the first image data and the first depth data, the first augmented reality content generator corresponding to the selected first selectable graphical item, the first image data and the first depth data being captured with a camera; and generating a message including the applied first augmented reality content generator to the first image data and the first depth data.

12. The system of claim 11, wherein the memory includes further instructions, which further cause the processor to perform further operations comprising:
receiving a swipe gesture via a touch screen of the client device; and
in response to receiving the swipe gesture, causing navigation through the plurality of selectable graphical items.

13. The system of claim 11, wherein applying the first augmented reality content generator to the first image data generates second image data.

14. The system of claim 11, wherein the memory includes further instructions, which further cause the processor to perform further operations comprising:
rendering second image data by applying the first augmented reality content generator to the first image data; and
causing display of the rendered second image data, the rendered second image data comprising an interactive 3D effect.

15. The system of claim 11, wherein the memory includes further instructions, which further cause the processor to perform further operations comprising:
performing a background in-painting technique to eliminate a portrait from a background of the first image data.

16. The system of claim 11, wherein generating the message further includes information related to a depth map and a portrait segmentation mask.

17. The system of claim 11, wherein the first image data and the first depth data are captured by an optical sensor of a client device.

18. The system of claim 11, wherein the 3D effect comprises an image processing operation on the image data or the depth data.

19. The system of claim 11, wherein the memory includes further instructions, which further cause the processor to perform further operations comprising:
rendering a view of the first image data and the first depth data based on the applied first 3D effect;
receiving movement data from a movement sensor;
updating a view of the first image data and the first depth data based at least in part on the movement data; and
rendering the updated view the first image data and the first depth data.

20. A non-transitory computer-readable medium comprising instructions, which when executed by a computing device, cause the computing device to perform operations comprising:
selecting a set of augmented reality content generators from a plurality of available augmented reality content generators, the selected set of augmented reality content generators comprising at least one augmented reality content generator for applying a three-dimensional (3D) effect;
causing display of a carousel interface comprising a plurality of selectable graphical items, each selectable graphical item corresponding to a respective augmented reality content generator of the set of augmented reality content generators;
receiving, at a client device, a selection of a first selectable graphical item from the plurality of selectable graphical items, the first selectable graphical item comprising a first augmented reality content generator for applying a first 3D effect;
generating a segmentation mask based on first image data;
applying the segmentation mask on first depth data to reduce a set of artifacts in a depth map based on the first depth data;
generating a packed depth map based at least in part on the depth map, the generating the packed depth map comprising:
converting a single channel floating point texture to a raw depth map, and
generating multiple channels based at least in part on the raw depth map;
applying, to the first image data and the first depth data, the first augmented reality content generator corresponding to the selected first selectable graphical item, the first image data and the first depth data being captured with a camera; and
generating a message including the applied first augmented reality content generator to the first image data and the first depth data.

* * * * *